US012722910B2

(12) United States Patent
Begin et al.

(10) Patent No.: US 12,722,910 B2
(45) Date of Patent: Sep. 1, 2026

(54) CONTROL SYSTEM AND METHODS FOR A WORKPIECE TRANSFER SYSTEM HAVING MULTIPLE ARMS COUPLED TO A MOVEABLE RAIL

(71) Applicant: Norgren Automation Solutions, LLC, Saline, MI (US)

(72) Inventors: John Begin, New Baltimore, MI (US); David Burke, Leoma, TN (US); Brian Smith, Ypsilanti, MI (US); Hamilton LaRee, Petersburg, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 386 days.

(21) Appl. No.: 18/291,616

(22) PCT Filed: Jul. 22, 2022

(86) PCT No.: PCT/EP2022/070610
§ 371 (c)(1),
(2) Date: Jan. 24, 2024

(87) PCT Pub. No.: WO2023/006602
PCT Pub. Date: Feb. 2, 2023

(65) Prior Publication Data

US 2024/0367920 A1 Nov. 7, 2024

Related U.S. Application Data

(60) Provisional application No. 63/226,900, filed on Jul. 29, 2021.

(51) Int. Cl.
*B65G 47/91* (2006.01)

(52) U.S. Cl.
CPC ......... *B65G 47/917* (2013.01); *B65G 47/918* (2013.01)

(58) Field of Classification Search
CPC ............................ B65G 47/917; B65G 47/918
See application file for complete search history.

(56) References Cited

U.S. PATENT DOCUMENTS 4,462,521 A * 7/1984 Takagi .................. B21K 27/04 198/621.3
4,540,087 A * 9/1985 Mizumoto ........... B21D 43/055 72/421

(Continued)

FOREIGN PATENT DOCUMENTS

| | | | |
|---|---|---|---|
| CN | 111 421 543 | A | 7/2020 |
| EP | 2 617 535 | A2 | 7/2013 |
| JP | 2011 125950 | A | 6/2011 |

OTHER PUBLICATIONS

Search Report prepared by the Great Britain Patent Office in application No. GB 2113399.6 dated Jun. 24, 2022.

(Continued)

*Primary Examiner* — Kyle O Logan
(74) *Attorney, Agent, or Firm* — McDonnell Boehnen Hulbert & Berghoff LLP

(57) ABSTRACT

An example method includes receiving task identification information indicative of a manufacturing task to be performed on a workpiece, wherein the workpiece transfer system comprises a rail and a plurality of arms coupled to the rail, wherein each arm comprises (i) a plurality of arm linkages coupled at respective joints, (ii) an arm controller in communication with the supervisory controller, and (iii) respective joint controllers in communication with the arm controller and configured to actuate respective rotary actuators at the respective joints to move the plurality of arm linkages relative to each other: retrieving a motion plan corresponding to the manufacturing task and the workpiece: sending command signals to respective arm controllers to communicate respective command signals to the respective (Continued)

joint controllers and execute the motion plan; and once the final desired configuration is achieved, commanding the respective arm controllers to lock the respective joints.

20 Claims, 12 Drawing Sheets

(56) References Cited

U.S. PATENT DOCUMENTS

| | | | | |
|---|---|---|---|---|
| 4,607,516 | A * | 8/1986 | Schafer ................ | B21D 43/055 72/422 |
| 5,105,647 | A * | 4/1992 | Maher .................. | B21D 43/055 72/405.13 |
| 6,233,538 | B1 * | 5/2001 | Gupta ...................... | B21D 5/02 703/7 |
| 8,469,425 | B1 | 6/2013 | Lofley, Sr. et al. | |
| 10,105,853 | B1 | 10/2018 | Hwang et al. | |
| 10,124,486 | B2 | 11/2018 | Marttinen et al. | |
| 10,335,947 | B1 * | 7/2019 | Diankov ................ | B25J 9/1664 |
| 2001/0016805 | A1 | 8/2001 | Gupta et al. | |
| 2020/0230824 | A1 | 7/2020 | Filipiak et al. | |
| 2021/0086357 | A1 | 3/2021 | Peyton | |
| 2021/0107167 | A1 | 4/2021 | Lin et al. | |
| 2021/0200219 | A1 * | 7/2021 | Gaschler .............. | G05D 1/0274 |

OTHER PUBLICATIONS

International Search Report and Written Opinion prepared by the European Patent Office in International Application No. PCT/EP2022/070610 dated Nov. 7, 2022.

* cited by examiner 902
602
904
606

900
604
906

Figure 13:
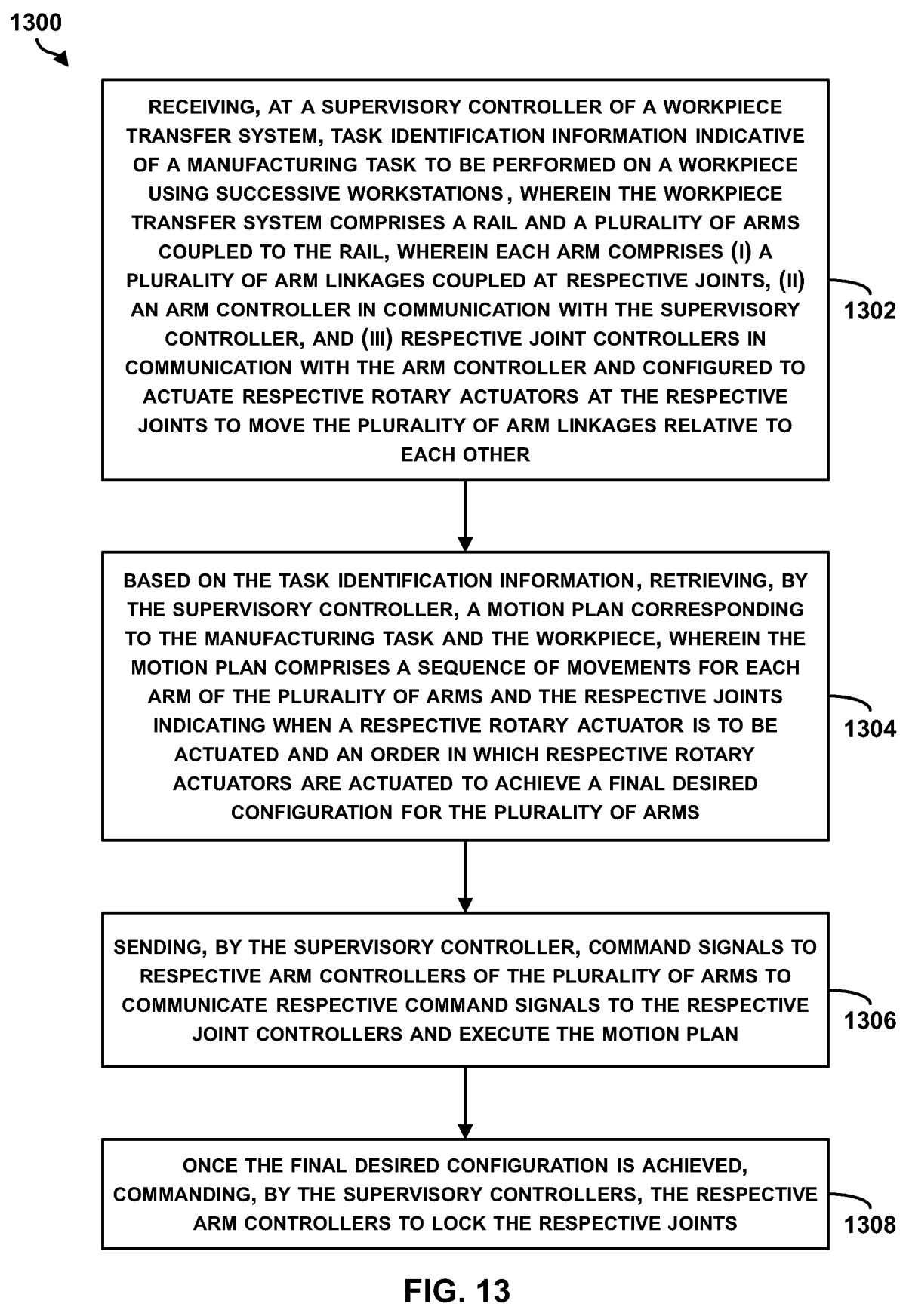

1300

RECEIVING, AT A SUPERVISORY CONTROLLER OF A WORKPIECE TRANSFER SYSTEM, TASK IDENTIFICATION INFORMATION INDICATIVE OF A MANUFACTURING TASK TO BE PERFORMED ON A WORKPIECE USING SUCCESSIVE WORKSTATIONS, WHEREIN THE WORKPIECE TRANSFER SYSTEM COMPRISES A RAIL AND A PLURALITY OF ARMS COUPLED TO THE RAIL, WHEREIN EACH ARM COMPRISES (I) A PLURALITY OF ARM LINKAGES COUPLED AT RESPECTIVE JOINTS, (II) AN ARM CONTROLLER IN COMMUNICATION WITH THE SUPERVISORY CONTROLLER, AND (III) RESPECTIVE JOINT CONTROLLERS IN COMMUNICATION WITH THE ARM CONTROLLER AND CONFIGURED TO ACTUATE RESPECTIVE ROTARY ACTUATORS AT THE RESPECTIVE JOINTS TO MOVE THE PLURALITY OF ARM LINKAGES RELATIVE TO EACH OTHER

1302

BASED ON THE TASK IDENTIFICATION INFORMATION, RETRIEVING, BY THE SUPERVISORY CONTROLLER, A MOTION PLAN CORRESPONDING TO THE MANUFACTURING TASK AND THE WORKPIECE, WHEREIN THE MOTION PLAN COMPRISES A SEQUENCE OF MOVEMENTS FOR EACH ARM OF THE PLURALITY OF ARMS AND THE RESPECTIVE JOINTS INDICATING WHEN A RESPECTIVE ROTARY ACTUATOR IS TO BE ACTUATED AND AN ORDER IN WHICH RESPECTIVE ROTARY ACTUATORS ARE ACTUATED TO ACHIEVE A FINAL DESIRED CONFIGURATION FOR THE PLURALITY OF ARMS

1304

SENDING, BY THE SUPERVISORY CONTROLLER, COMMAND SIGNALS TO RESPECTIVE ARM CONTROLLERS OF THE PLURALITY OF ARMS TO COMMUNICATE RESPECTIVE COMMAND SIGNALS TO THE RESPECTIVE JOINT CONTROLLERS AND EXECUTE THE MOTION PLAN

1306

ONCE THE FINAL DESIRED CONFIGURATION IS ACHIEVED, COMMANDING, BY THE SUPERVISORY CONTROLLERS, THE RESPECTIVE ARM CONTROLLERS TO LOCK THE RESPECTIVE JOINTS

CONTROL SYSTEM AND METHODS FOR A WORKPIECE TRANSFER SYSTEM HAVING MULTIPLE ARMS COUPLED TO A MOVEABLE RAIL

BACKGROUND

In a manufacturing facility, various manufacturing and assembly operations are performed on numerously configured workpieces. Such operations involve manufacturing (e.g., machining, welding, stamping, etc.) and assembly operations being performed on the workpieces as well as operations of handling and shuttling the workpieces between workstations.

A particular operation may be performed on the workpiece at each workstation. Once the operation at the workstation is performed, the workpiece is moved to the next successive workstation where further operations are to be performed.

Handling and shuttling the workpiece involves using tooling assemblies that attach to the workpiece and moving the workpiece from one workstation to another. In order to accommodate different types of workpieces and associated operations, the tooling assemblies can take on many different configurations. Conventional tooling assemblies have utilized various sections of tubing interconnected by various rigid mounts for fixturing a variety of workpieces, but such designs typically provide little or no adjustment in the tooling assembly. Other designs have utilized extrusions, slide mounts, ball mounts, and serrated teeth thereby allowing the sections of the tubing to be adjusted in various directions, including linearly and radially. However, such designs have a limited amount of flexibility. Further, for different workpieces, different end-effector might be needed for the tool assemblies.

Adjusting or replacing numerous tooling assemblies and replacing end-effectors for a particular workpiece is a timely and tedious process. Particularly, a different set of tooling assemblies and end-effector tooling may be maintained for each differently shaped workpiece, and thus numerous tooling assemblies and end-effector tooling are purchased, stored, and maintained, thereby creating inefficiencies in an industrial environment. Further, each workpiece may required a different configuration of tooling assemblies. Changing the configuration for every workpiece manually, can be time consuming and costly.

It may thus be desirable to provide an automated workpiece transfer system that adjusted for any configuration of workpiece without having to purchase, store, and maintain multiple sets of prepositioned tooling assemblies and end-effector tooling. It may also be desirable to have a distributed control system where one controller is configured to position the tooling assemblies in a particular configuration while another controller is configured to control the transfer of the workpiece and the tooling assemblies attached thereto between different workstations. This way, the tooling assemblies need not be configured to handle a substantial weight.

It is with respect to these and other considerations that the disclosure made herein is presented.

SUMMARY

Within examples described herein, the present disclosure describes implementations that relate to a control system and methods for a workpiece transfer system having multiple arms coupled to a movable rail.

In a first example implementation, the present disclosure describes a method. The method includes: receiving, at a supervisory controller of a workpiece transfer system, task identification information indicative of a manufacturing task to be performed on a workpiece using successive workstations, wherein the workpiece transfer system comprises a rail and a plurality of arms coupled to the rail, wherein each arm comprises (i) a plurality of arm linkages coupled at respective joints, (ii) an arm controller in communication with the supervisory controller, and (iii) respective joint controllers in communication with the arm controller and configured to actuate respective rotary actuators at the respective joints to move the plurality of arm linkages relative to each other; based on the task identification information, retrieving, by the supervisory controller, a motion plan corresponding to the manufacturing task and the workpiece, wherein the motion plan comprises a sequence of movements for each arm of the plurality of arms and the respective joints indicating when a respective rotary actuator is to be actuated and an order in which respective rotary actuators are actuated to achieve a final desired configuration for the plurality of arms; sending, by the supervisory controller, command signals to respective arm controllers of the plurality of arms to communicate respective command signals to the respective joint controllers and execute the motion plan; and once the final desired configuration is achieved, commanding, by the supervisory controllers, the respective arm controllers to lock the respective joints.

In a second example implementation, the present disclosure describes a system. The system includes: a workpiece transfer subsystem configured to transfer a workpiece between successive workstations, wherein the workpiece transfer system comprises a rail and a plurality of arms coupled to the rail, wherein each arm comprises (i) a plurality of arm linkages coupled at respective joints, (ii) an arm controller, and (iii) respective joint controllers in communication with the arm controller and configured to actuate respective rotary actuators at the respective joints to move the plurality of arm linkages relative to each other; a system controller having access to a task and workpiece database comprising task identification information for a variety of manufacturing tasks to be performed on a variety of workpieces; and a supervisory controller in communication with the system controller and the respective arm controllers of the plurality of arms, wherein the supervisory controller has access to a motion plans database comprising respective motion plans corresponding to the variety of manufacturing tasks, wherein each motion plan comprises a sequence of movements for each arm of the plurality of arms and the respective joints indicating when a respective rotary actuator is to be actuated and an order in which respective rotary actuators are actuated to achieve a final desired configuration for the plurality of arms. The supervisory controller comprises one or more processors, and a non-transitory computer-readable medium storing thereon instructions that, when executed by the one or more processors, cause the supervisory controller to perform operations of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 1 illustrates a system for transferring a workpiece, in accordance with an example implementation.

FIG. 13 is a flowchart of a method for controlling a workpiece transfer system, in accordance with an example implementation.

DETAILED DESCRIPTION

Figure 1:
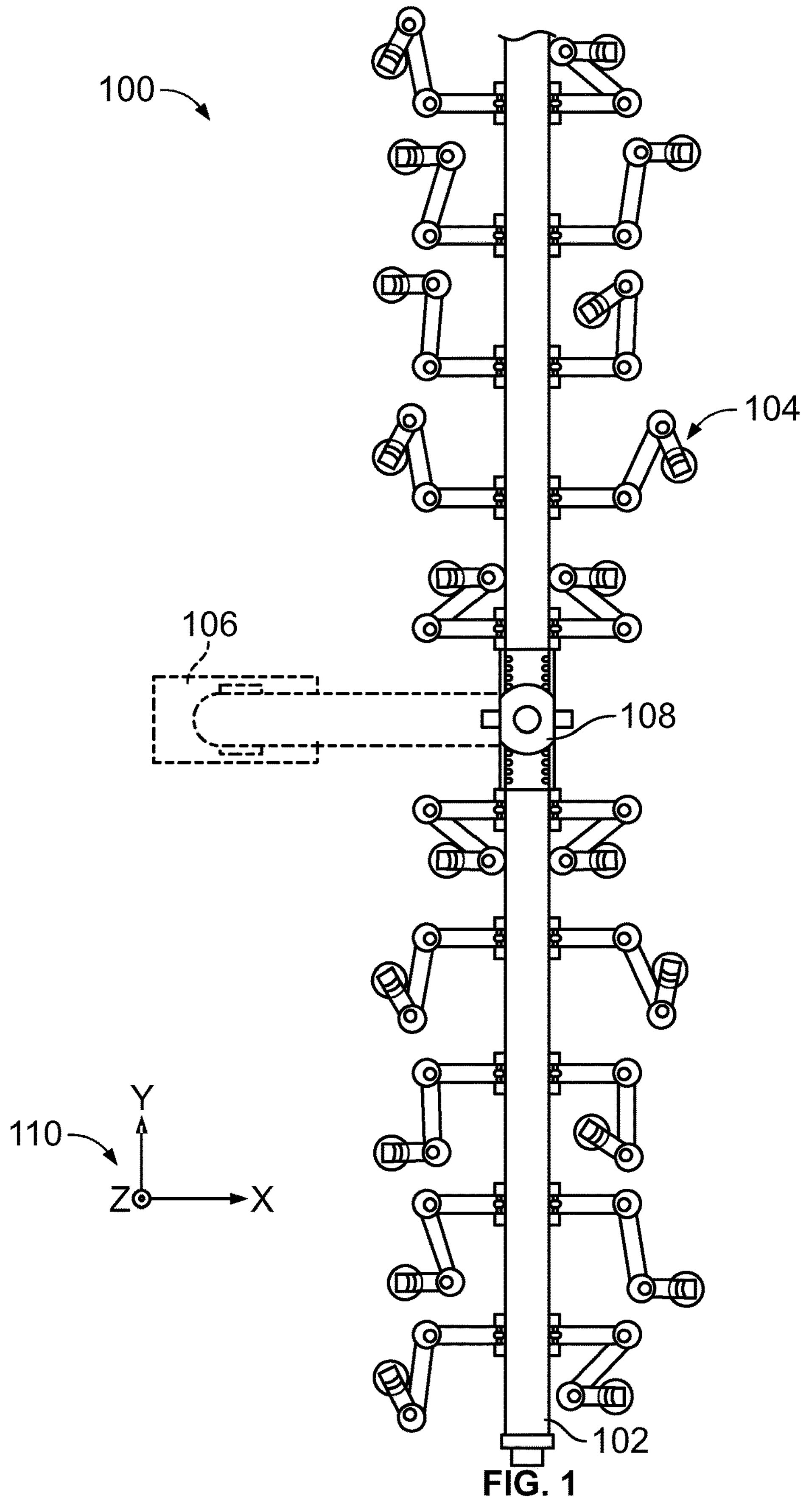
FIG. 1 illustrates

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Disclosed herein are control systems and methods for a workpiece transfer system having multiple arm system coupled to a movable rail for use in a manufacturing environment involving successive workstations. The arms operate as tooling assemblies with end-effectors configured to attach to or hold the workpiece to transfer the workpiece between the successive workstations. Particularly, the arms are attached to the movable rail, and the movable rail is actuated to move the arms with the workpiece between two successive workstations.

The control system can involve several controllers. A system controller determines the "job," task, or operations to be performed on which workpiece. The system controller is also configured to actuate the movable rail to move it when an operation is performed on the workpiece to move the workpiece to the next workstation.

The control system further includes a supervisory controller in communication with the system controller and configured to receive an identifier or task identification information of the "job" or task to be performed, and the identifier indicates the type of the workpiece, the corresponding end-effector, and the corresponding configuration of the arms that properly holds the workpiece and facilitate transferring it between workstations. The supervisory controller then retrieves a motion plan that includes the waypoints and the sequence of movement that the arms execute to achieve the desired arms configuration without the arms colliding with each other.

Each arm may have a respective arm controller. Further, each arm may have several arm linkages coupled to each other at joints with rotary actuators, such as electric motors for example. Each joint may have a respective joint controller that controls the respective motor.

The supervisory controller communicates with the respective arm controllers to execute the motion plan for the respective arms, and the arm controllers in turn communicate with the respective joint controller to place the arm linkages at the particular desired configuration. Thus, the supervisory controller "orchestrates" the movements of the arms based on a predetermined motion plan to achieve the particular configuration associated with the particular "job" to be performed. The supervisory controller then commands the arms to lock the joints in place at the particular configuration.

Once the arm configuration is achieved and the joints are locked, the system is ready to pick the workpiece and move it from one workstation to another. Particularly, the system controller can actuate the rail to place the rail near or on top of the workpiece at a workstation, move the rail toward the workpiece and allow the arms and end-effectors to engage the workpiece, and then move the rail to the next workstation. The workpiece can then be released, and the rail and associated arms are moved out of the way to allow a manufacturing operation to be performed on the workpiece. The system controller then actuates the rail back to the previous workstation where the cycle begins again with the next workpiece.

With this configuration, the supervisory controller orchestrates or coordinates the motion of the various arms to automatically place the arms in a configuration suitable for the particular task based on a predetermined motion plan. The supervisory controller communicates with the arm controllers, which in turns communicates with the joint controllers to execute the motion plan that places the arms in the desired configuration corresponding to the task. Adjusting the arm configuration for different tasks or different workpieces can thus be accomplished automatically by providing a different task identifier and retrieving a corresponding motion plan. This configuration may substantially reduce the time required to adjust tooling configurations between various jobs and tasks.

Further, the system controller moves the rail between the workstations such that weight-carrying is mostly accomplished via the rail, not via the arms. As such, the size of the motors at the joints is sufficient to engage the workpiece, but does not need to be capable of carrying large weights.

FIG. 1 illustrates a system 100 for transferring a workpiece, in accordance with an example implementation. The system 100 that includes a rail 102 and a plurality of arms 104 coupled to the rail 102. The arms 104 can also be referred to as tooling assemblies. As described below the arms 104 are each configured as an articulated arms rotatably-coupled to the rail 102 and having a plurality of arm linkages rotatably-coupled to each other at respective joints. Once the arms 104 are placed at a particular configuration corresponding to the workpiece and the operation to be performed, the arms 104 are locked (e.g., via clutches or brakes) in place with no relative motion therebetween or with respect to the rail 102.

The system 100 also includes a rail actuator 106 coupled to the rail 102 at a connector 108. The system 100 is used to perform a transfer operation in which a workpiece is moved from a first workstation to a second workstation adjacent the first workstation. After moving the workpiece to the second workstation, the system 100 returns to the first workstation to repeat the transfer operation with respect to the next workpiece. For example, the first workstation could include a first machine that performs a first operation with respect to the workpiece, and the second workstation could include a second machine that performs a second operation with respect to the workpiece. During the transfer operation, the rail actuator 106 moves the rail 102 and the arms 104 coupled to the rail 102, and the arms 104 have end-effectors that are attached to the workpiece, which thus moves along with the rail 102 and the arms 104.

The rail 102 can be a substantially rigid elongate member. The rail actuator 106 is connected to the rail 102 for moving the rail 102 in two or more degrees of freedom. In an example, the rail actuator 106 can be connected to and released from the rail 102 at the connector 108, with the connector 108 being a quick-release style connection that provides mechanical, electrical, and/or pneumatic connection of the rail 102 with respect to the rail actuator 106. In another example, the rail actuator 106 is permanently connected to the rail 102 at the connector 108 by any suitable rigid fastening structure. Using the rail actuator 106, the rail 102 and all of the arms 104 that are connected to the rail 102 can be moved in unison between workstations.

In an example, the rail actuator 106 can be a robotic manipulator configured to move the rail 102 between workstations. However, the rail actuator 106 can involve any type of actuation system (e.g., electric, hydraulic, pneumatic, etc.) configured to move the rail 102 between workstations Each arm of the arms 104 is connected to the rail 102 at a fixed location on the rail 102. Connection of the arms 104 to the rail 102 can be accomplished using any suitable rigid fastening structure or a quick connect structure that is operable to accurately position and precisely hold the arms 104 in a desired position with respect to the rail 102.

As described in more details below, the arms 104 are positioned in a desired configuration with respect to the rail 102, where the configuration is dependent upon the geometry and type of the workpiece that is to be handled by the system 100. In an example, a large number of cycles of the transfer operation are performed with respect to a single type of workpiece, with each of the individual workpieces of a certain type having a certain geometry. When it is desired to use the system 100 with a different type of workpiece having a different geometry, the configurations of some or all of the arms 104 can be changed so that they adopt a configuration that is suited for use with the different workpiece.

Figure 2:
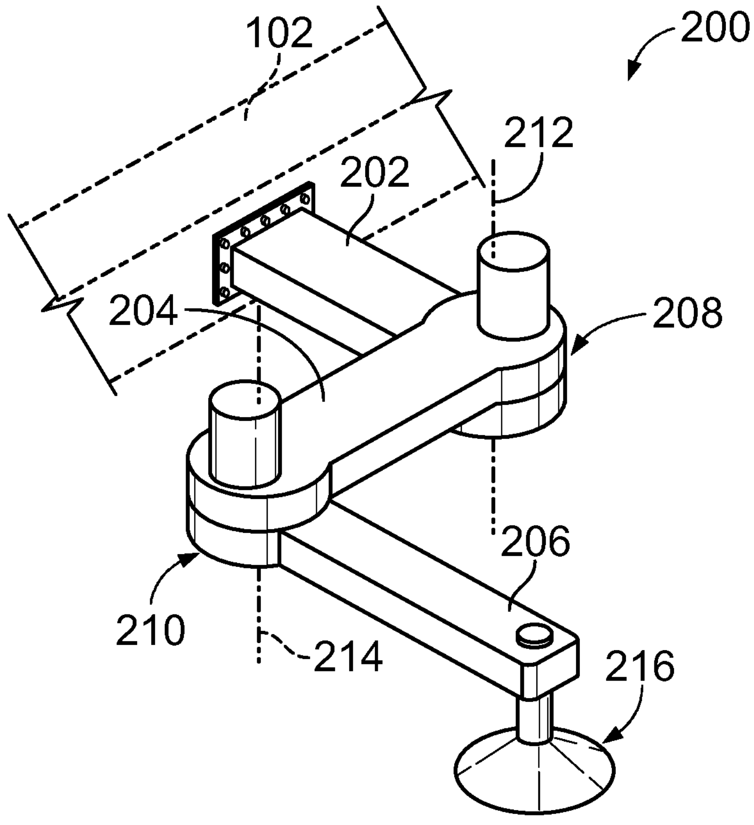
FIG. 2 illustrates a partial perspective view of an arm, in accordance with an example implementation.

FIG. 2 illustrates a partial perspective view of an arm 200, in accordance with an example implementation. The arm 200 represents any of the arms 104 shown in FIG. 1, for example. As shown in FIG. 2, the arm 200 includes a plurality of arm linkages such as arm linkage 202, arm linkage 204, and arm linkage 206.

The arm linkages 202-206 are rigid, elongate members that are interconnected by one or more respective joints, such as joint 208 and joint 210. Particularly, the arm linkage 202 is connected to the arm linkage 204 by the joint 208, and the arm linkage 204 is connected to the arm linkage 206 by the joint 210. The arm linkage 202 is shown as rigidly coupled to a rail 102. However, it should be understood that in some applications, the arm linkage 202 can be coupled to the rail 102 via another joint that allows the arm linkage 202 to rotate relative to the rail 102.

The joints 208, 210 can be actuatable via rotary actuators such as electric motors, for example. Each electric motor can have a respective joint controller (not shown) that controls the electric motor. The arm 200 can include an arm controller (not shown in FIG. 2; see, e.g., arm controller 312 in FIG. 3) that communicates and commands the joint controllers to actuate the electric motors of the joints 208, 210 to rotate the arm linkages 202, 204, and 206 relative to each other at the joints 208, 210.

The joint 208 is configured to cause rotation about a first axis 212. In particular, the electric motor of the joint 208 can be actuated to rotate to a desired position, which causes the arm linkage 204 to rotate with respect to the arm linkage 202 about the first axis 212. This adjustment can move the arm linkage 206 as well. The second joint 210 is configured to cause rotation about a second axis 214. In particular, the electric motor of the joint 210 can be actuated to rotate to a desired position, which causes the arm linkage 206 to rotate with respect to the arm linkage 204 about the second axis 214.

An end-effector 216 is connected to the arm linkage 206 at an end opposite the end where the joint 210 is located. The end-effector 216 is configured to engage a workpiece. The end-effectors of the arms 104 engage the workpiece at the same time during the transfer operation, thereby allowing the system 100 to pick up and move the workpiece. In the illustrated example, the end-effector 216 is configured as a vacuum cup or suction cup. However, other types of end-effectors can be used, such as grippers, magnets, shovels, etc.

Referring back to FIG. 1, the top view of the system 100 shows that the arms 104 can move in a two-dimensional coordinate system to place the respective suction cups of the arms 104 at particular coordinates. In examples, the rail 102 can be elevated with respect to the joints (i.e., the rail is not co-planar with the joints) to allow for three-dimensional (3D) movement of the arms 104. This way, the suction cups can be position in a 3D coordinate system such as coordinate system 110 (e.g., a Cartesian coordinate system), and the arms linkages of adjacent arms of the arms 104 can overlap with each other to allow for achieving complex arm configurations.

Figure 3:
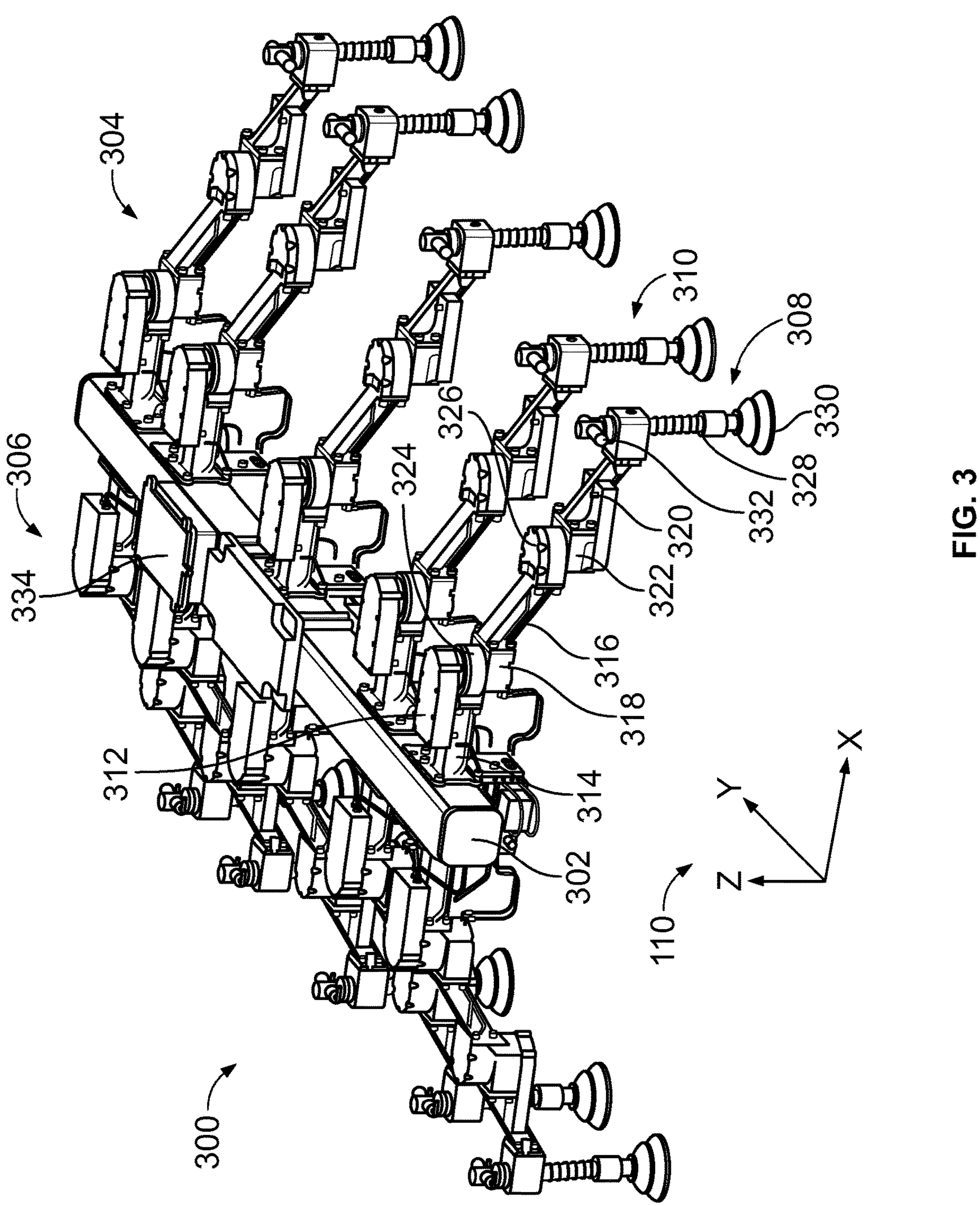
FIG. 3 illustrates a system for transferring a workpiece allowing for three-dimensional positioning of end-effectors and overlap between arm linkages of adjacent arms, in accordance with an example implementation.

FIG. 3 illustrates a system 300 for transferring a workpiece allowing for 3D positioning of end-effectors and overlap between arm linkages of adjacent arms, in accordance with an example implementation. The system 300 is similar to the system in 100. For example, the system 300 has a rail 302 in a central location with a plurality of arms coupled thereto. Particularly, a first set of arms 304 is coupled to one side of the rail 302 and a second set of arms 306 are coupled to the opposite side of the rail 302.

The arms are similar to the arms 104 describe above in that each arm of the sets of arms 304, 306 has several arm linkage connected at respective joints. Further, the rail 302 is elevated with respect to the joints of the arms so as to allow for 3D motion and positioning of the suction cups. In other words, the joints of the arms are not planar with the rail 302. Rather, the rail 302 is positioned vertically above at least some of the joints to allow arms linkages of adjacent arms to overlap and also allow some arm linkages to cross to the other side of the rail 302 (e.g., by moving underneath an crossing the rail 302).

As a particular example, the set of arms 304 includes two adjacent arms such as arm 308 and arm 310. The arm 308 has an arm controller 312 attached to a base 314 of the arm 308. The arm 308 further has a first arm linkage 316 coupled to the base 314 at a first joint 318, and has a second arm linkage 320 coupled to the first arm linkage 316 at a second joint 322. A rotary actuator such as an electric motor is disposed within each joint of the first joint 318 and the second joint 322 to facilitate rotation of the arm linkages 316, 320 relative to each other and relative to the base 314.

The arm 308 further includes a first joint controller 324 configured to control the rotary actuator, e.g., the electric motor, of the first joint 318, and also includes a second joint controller 326 configured to control the rotary actuator, e.g., the electric motor, of the second joint 322.

The arm 308 further includes a tube 328 to which a suction cup 330 is attached. A valve or manifold having a port 332 is coupled to the tube 328. A vacuum generating device (e.g., a blower—not shown) can be fluidly coupled to the port 332 to generate a vacuum environment in the tube 328 and enable the suction cup 330 to attract the workpiece thereto via suction. The other arms are configured similarly.

The system 300 further includes a supervisory controller 334. As described in detail below with respect to FIGS. 6-7, the supervisory controller 334 can be in communication with a system controller and is configured to receive from the system controller information (e.g., an identifier) that identifies the task to be performed, the type of workpiece, the configuration of the workpiece, etc. The supervisory controller 334 can then retrieve a motion plan that defines (i) the configuration of all the arms (i.e., the sets of arms 304, 306) that corresponds to the task and the workpiece, wherein the configuration defines which subset of arms of the sets of arms 304, 306 are to be active and engage the workpiece, and which subset of arms should be inactive or "parked", (ii) the waypoints (e.g., intermediate points, coordinates, or places that the arm linkages and joints assume on trajectory to a final position of the arm associated with the desired configuration of the arm), and (iii) the sequence of movements of the arms and their respective joints and arm linkages that the arms execute to achieve the waypoints, and ultimately the desired configuration.

In an example, the waypoints can be considered as stopping points or points at which the course or trajectory of motion is changed while the arm is moving through a particular sequence of movements to achieve its desired final position. In other words, the motion plan indicates a series of waypoints for each arm and respective joints to achieve a final desired configuration, and a sequence of movements for each arm and respective joints indicating when a respective rotary actuator moves and an order in which respective rotary actuators of the joints are actuated. Based on the configuration, size, and geometry of the workpiece, the subset of arms to engage the workpiece may include all the arms of the sets of arms 304, 306.

The motion plan can include other information such as whether or not a particular sensor is active and is to be monitored, whether an end-effector it active and is to be controlled. Further, for arms that are not used, the motion plan can include information indicating that their end-effectors are to be inactive and sensors associated with the end-effector are not to be monitored. The motion plan can also include information indicative of joint speeds during execution of the motion plan.

The supervisory controller 334 then communicates or sends commands to execute the motion plan to the arm controller 312 (and respective arm controllers of the other arms), which in turn sends command signals to the joint controllers 324, 326) to actuate the rotary actuators and execute the motion plan.

Each controller, i.e., the supervisory controller 334, the arm controller 312, and the joint controllers 324, 326, can include one or more printed circuit boards (PCBs). A PCB mechanically supports and electrically connects electronic components (e.g., microprocessors, integrated chips, capacitors, resistors, etc.) using conductive tracks, pads, and other features etched from one or more sheet layers of copper laminate onto and/or between sheet layers of a nonconductive substrate. Components are generally soldered onto the PCB to both electrically connect and mechanically fasten them to it.

In an example, the joint controllers 324, 326 can include respective inverters configured to receive direct current (DC) power and convert the DC power to three-phase, alternating current (AC) power that can be provided to wire windings of the respective electric motors. For example, the inverters can include a semiconductor switching matrix having any arrangement of semiconductor switching devices that supports DC to three-phase power conversion. For example, the semiconductor switching matrix can include a three-phase, with bridge elements electrically-coupled to input DC terminals and connected to three-phase AC output terminals.

Each controller i.e., the supervisory controller 334, the arm controller 312, and the joint controllers 324, 326, or the boards of the controllers can have a respective microprocessor that can include one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI) to perform the operations described throughout herein. A processor can be configured to execute hard-coded functionality in addition to or as an alternative to software-coded functionality (e.g., via CRPI). The controllers can further be packaged with a plurality of sensors to facilitate feedback control and monitoring of the arm linkages, the joints, and electric motors, for example.

The configuration of the system 300 enables it to assume various complex configurations. By virtue of the rail 302 being elevated with respect to the joint 318, for example, the arm 308 can rotated through space underneath the rail 302 and cross to the other side of the rail 302, and so can all the other arms. The arms can further cross each other as they rotate while elevating some arms or arm linkages of adjacent arms over each other. This way, complex 3D configurations can be achieved to suit a variety of workpieces.

FIGS. 1 and 3 illustrate system configurations having a single rail (i.e., the rail 102 or the rail 302) with the arms (the arms 104 or the sets of arms 304, 306) being mounted on opposite sides of the single rail. In another example implementation, a system can include a tandem pair of rails that are substantially-parallel and positioned on opposite sides of the workstation. In the configuration having the pair of rails, each of the arms are mounted on interior, opposing sides of the adjacent pair of rails.

Figure 4:
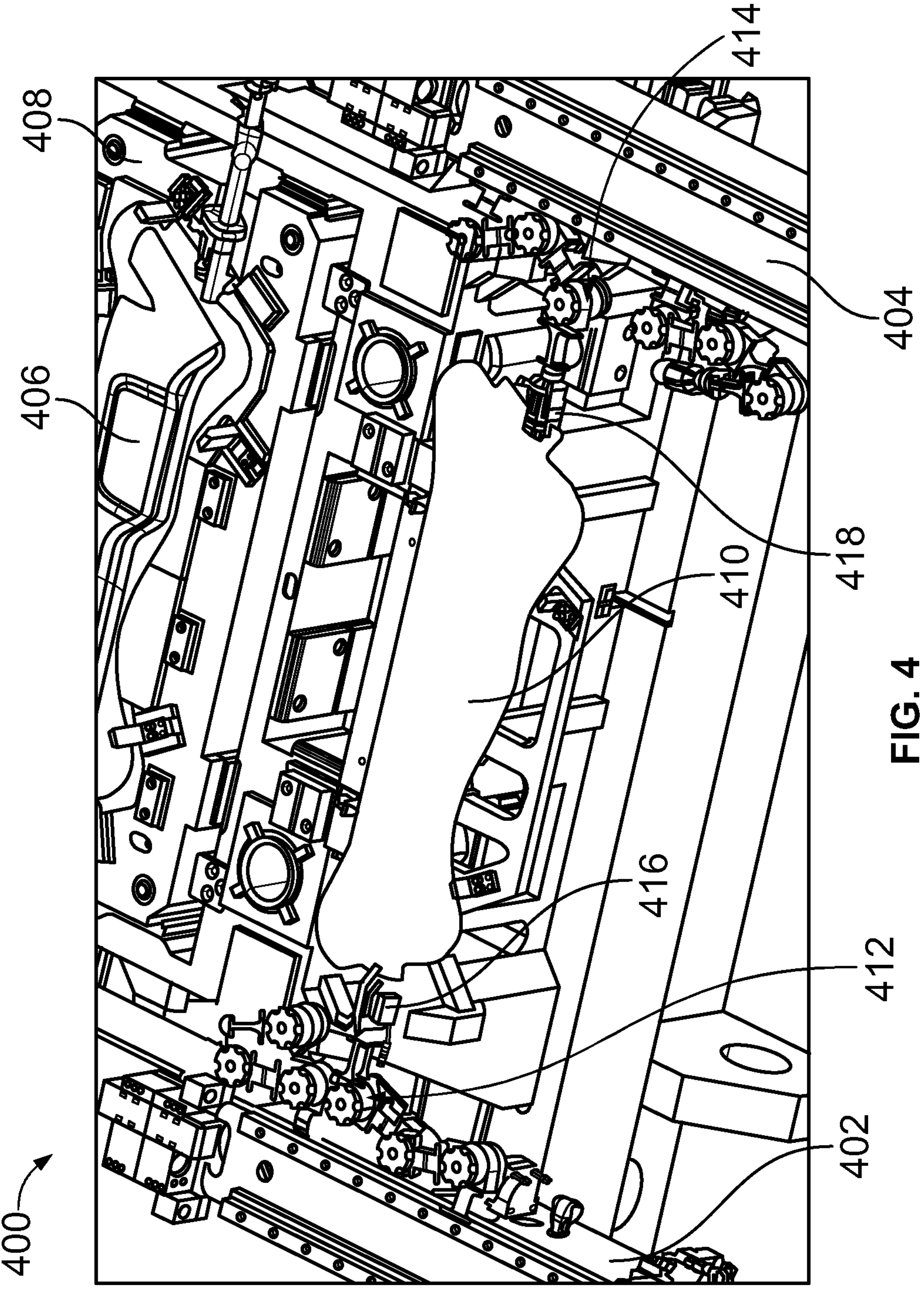
FIG. 4 illustrates a system having a first rail and a second rail, in accordance with an example implementation.

FIG. 4 illustrates a system 400 having a first rail 402 and a second rail 404, in accordance with an example implementation. The system 400 can be used in any manufacturing operation having successive workstations, such as an industrial stamping press having successive workstations, an assembly line having successive workstations, a welding line comprising several successive welding workstations, etc. An industrial press is used as an example to describe FIG. 4; however, it should be understood that the system can be implemented in any other set-up involving successive workstations.

In the industrial stamping press, a workpiece 406 is stamped into progressive shapes and forms within a workstation 408 of the stamping press. Once the stamping process performed on the workpiece 406 at the workstation 408 is completed, the workpiece 406 is moved to the next workstation, and the rails 402, 404, then move another workpiece 410 to the workstation 408.

Particularly, the rails 402, 404 having respective arms coupled to interior, opposing sides of the rails 402, 404. For example, an arm 412 is coupled to the rail 402, and an arm 414 is coupled to the rail 404 opposite the arm 412. Each of the arms 412, 414 can be removably coupled to a respective end-effector or tool. In the example implementation shown in FIG. 4, the arm 412 is coupled to a gripper 416 and the arm 414 is coupled to a respective gripper 418. The grippers 416, 418 grip the workpiece 410 to be able to pick it from one workstation and move it to the next workstation, e.g., the workstation 408.

Notably, other arms are coupled to the rails 402, 404 as depicted in FIG. 4. However, these arms are not engaged with the workpiece 410 as the arms 412, 414 are sufficient to handle and shuttle the workpiece 410. As such, the other arms are in a “parked” or inactive position. The configuration of the arms coupled to the rails 402, 404 are suitable for the “job” of handling the workpieces 406, 410 through the stamping process. Other workpieces (e.g., larger workpieces) may require using more arms to be able to shuttle such workpieces.

In an example, the end-effectors can be removed and replaced with other end-effectors based on the task and the type of workpiece. For example, the arms can move to a location, release the end-effector coupled thereto, then attach to another end-effector.

In order for the arms 412, 414 to engage the workpiece 410 in a desired location on the workpiece 410, electrical, hydraulic, and/or pneumatic lines (not shown) may extend through and inside the rails 402, 404, then to the arms 412, 414 to actuate the arms 412, 414 and the grippers 416, 418. The electrical, hydraulic, and/or pneumatic lines are connected to a supply of electrical power and pressurized fluid to provide the arms 412, 414 and the grippers 416, 418 with the appropriate power to actuate them. To provide accurate positioning and support of the grippers 416, 418 (or any other end-effector), the arms 412, 414 have a plurality of arm linkages that are rotatably-coupled at their ends by joints.

Figure 5:
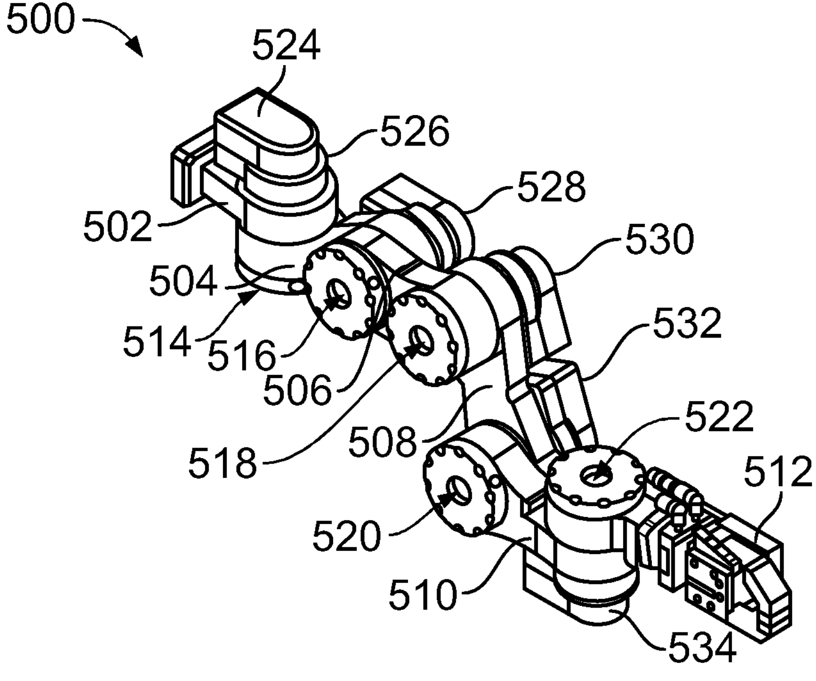
FIG. 5 illustrates a perspective view of an arm, in accordance with an example implementation.

FIG. 5 illustrates a perspective view of an arm 500, in accordance with an example implementation. The arm 500 represents any of the arms shown in FIG. 4, such as the arms 412, 414.

The arm 500 has a base 502, and arm linkages such as arm linkage 504, arm linkage 506, arm linkage 508, and arm linkage 510 extending outward from a rail (e.g., the rail 402 or the rail 404) to which the arm 500 is coupled. The arm linkage 510 is coupled to an end-effector 512 (e.g., a gripper).

The arm linkages 504-510 are rotatably-coupled to each other at joints. For example, the arm linkage 504 is coupled to the base 502 at a joint 514; the arm linkage 506 is coupled to the arm linkage 504 at joint 516 and to the arm linkage 508 at joint 518; the arm linkage 508 is coupled to the arm linkage 510 at joint 520, and the arm linkage 510 is coupled to the end-effector 512 at joint 522.

Each joint of the joints 514-522 can have a rotary actuator such an electric motor embedded therein. The electric motors can rotate the respective arm linkages when actuated about their respective joints. Particularly, the electric motors provide rotational adjustment of the arm linkages 504-510 at the joints 514-522 to provide multi-axis positioning of the end-effector 512. The number of arm linkages and joints illustrated in FIG. 5 is an example for illustration. More or fewer arm linkages and joints can be used based on the application.

The arm 500, and each of the other arms, can have an arm controller 524 disposed at the base 502 of the arm 500. The arm controller 524 receives commands and information regarding the motion plan from the supervisory controller (e.g., the supervisory controller 334).

Further, each joint, e.g., each rotary actuator of each joint, of the joints 514-522 is controlled by a respective joint controller. Particularly, the joint 514 is controlled by joint controller 526; the joint 516 is controlled by joint controller 528; the joint 518 is controlled by joint controller 530; the joint 520 is controlled by joint controller 532; and the joint 522 is controlled by joint controller 534. The arm controller 524 communicates with and sends command signals to each to the joint controllers 526-534 to move the arm linkages 504-510 in a particular sequence to their desired configuration or coordinates as provided by the motion plan. As such, the end-effector 512 can be positioned as desired to handle the workpiece 410.

Once the joints 514-522 are in the desired position, they are locked in place via the joint controllers 526-534 via clutches or other mechanisms. As such, the end-effector 512 is positioned at a predetermined position and held rigidly over a large number of operation cycles.

Referring back to FIG. 4, when the grippers 416, 418 engage the workpiece 410, and the workpiece is ready to be moved to the workstation 408, a rail actuator (e.g., the rail actuator 106 as described above) is used to move the rails 402, 404 vertically and horizontally to facilitate moving the workpiece 410 to the workstation 408. Once the workpiece 410 is placed at the workstation 408 for the stamping to be performed thereon, the rail actuator then again moves the rails 402, 404 vertically and horizontally to move them out of the way and return them back to pick the next workpiece.

The arms 412, 414 remain in the same configuration while the rails 402, 404 lift the arms 412, 414 along with the workpiece 410. This way, the rails 402, 404 and the rail actuator, rather than the arms 412, 414, have the structural rigidity and strength required for lifting and placing the workpieces.

A control system and methods are described next with respect to a single rail system as an example for illustration. However, it should be understood that the control system and methods are applicable to any of the systems 100, 300, 400 described above or any similar system.

Figure 6:
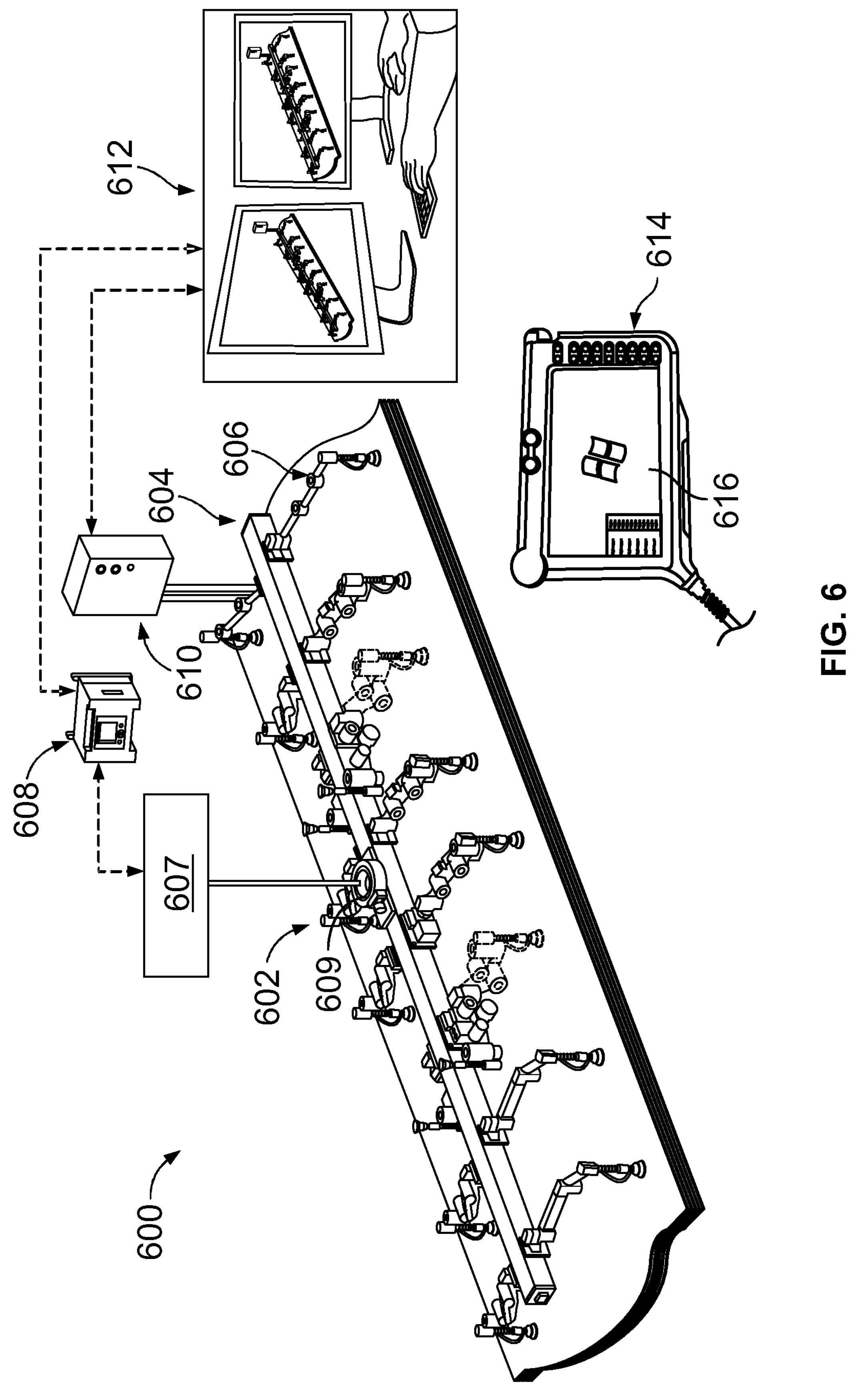
FIG. 6 illustrates a system, in accordance with an example implementation.
Figure 7:
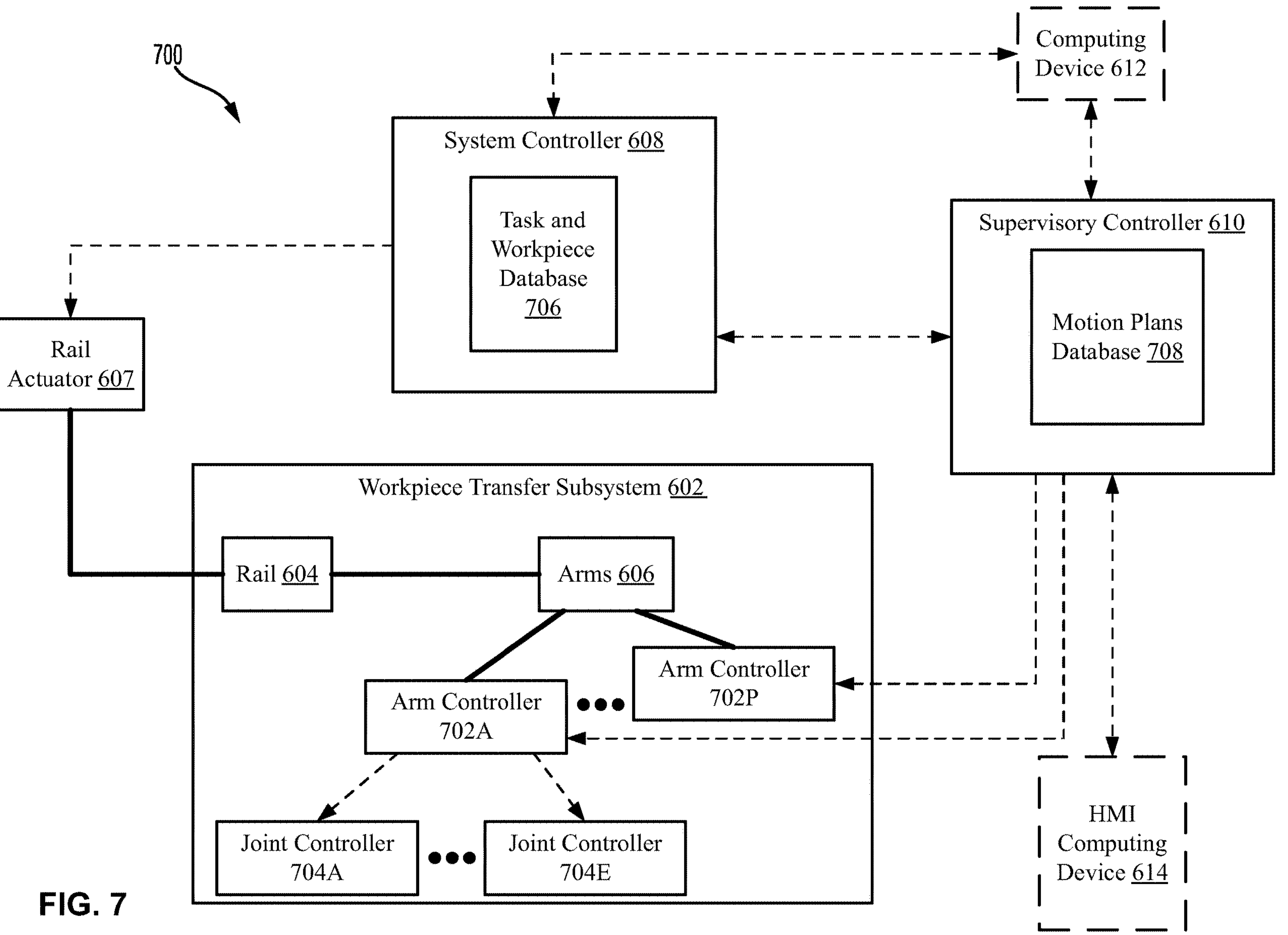
FIG. 7 illustrates a block diagram corresponding to the system of FIG. 6, in accordance with an example implementation.

FIG. 6 illustrates a system 600, and FIG. 7 illustrates a block diagram 700 corresponding to the system 600, in accordance with an example implementation. The system 600 includes a workpiece transfer subsystem 602 having a rail 604 and a plurality of arms 606. A rail actuator 607 (e.g., similar to the rail actuator 106) can be coupled via a connector 609 to the rail 604 to move the rail 604 between workstations.

As depicted, the plurality of arms 606 include sixteen arms mounted to opposite sides of the rail 604. The arms 606 can be configured similar to the arms 104, the arm 200, the sets of arms 304, 306, the arms 412, 414, or the arm 500, or a combination of all these arms or similar arms. Each arm has a plurality of arm linkages and joints therebetween. The plurality of arms 606 are shown with suction cup end-effectors. However, it should be understood that any other end-effector can be used. In an example, the plurality of arms 606 can change, not only the configuration of the arm linkages and joints, but also the type of end-effector as desired and as suitable for a particular "job" and workpiece type.

The system 600 includes a system controller 608 in communication with a supervisory controller 610 (e.g., similar to the supervisory controller 334 described above with respect to FIG. 3). As shown in the block diagram 700 of FIG. 7, the supervisory controller 610 is in turn in communication with respective arm controllers 702A, 702B, 702C, 702D, . . . 702P (i.e., sixteen arm controllers) mounted at the respective bases of the plurality of arms 606. Each arm controller of the arm controllers 702A-702P is in turn in communication with respective joint controllers 704A, 704B, 704C, 704D, 704E (e.g., five joints controllers) of the respective arms.

The system 600 further includes a computing device 612 (e.g., a remote computing system) in communication with one or both of the system controller 608 and the supervisory controller 610. The computing device 612 can have, for example, a computer aided design (CAD) software or any other software that can generate a motion plan. As mentioned above, a motion plan for each task and workpiece can include a series of waypoints for each arm and respective joints to achieve a final desired configuration, and a sequence of movements for each arm and respective joints indicating when a respective rotary actuator moves and an order in which respective rotary actuators of the joints are actuated. The motion plans can then be transmitted to the system controller 608 and/or the supervisory controller 610.

In some example implementations, the system 600 can further include human-machine interface, or HMI computing device 614. The HMI computing device 614 is in communication with the supervisory controller 610. In an example system having the HMI computing device 614, an operator can use it to interface with the supervisory controller 610 as described in more detail below. The HMI computing device 614 can have a touchscreen 616 to allow the operator to interact with the HMI computing device 614 and the supervisory controller 610 through user-selectable on-screen graphical items (e.g., buttons, menus, widgets, scroll bars, graphical objects, audio indicators, icons, etc.) to facilitate user-interaction.

An example computing device representing any of the controllers in FIGS. 6-7 is described below with respective to FIG. 12. Each controller can have one or more processors and a memory storing executable instructions that, when executed by the one or more processors, cause the controller to perform the operations described herein. The memory can store other information and databases as well. Further, each controller has a communication interface (wired or wireless) to communicate with other controllers or components of the system 600.

Referring to FIG. 7, solid lines indicate physical connection, whereas dashed arrows represent electric signal lines over a network or a bus (e.g., a Controller Area Network, CAN, bus). The computing device 612 and the HMI computing device 614 are depicted with dashed lines to indicate that they are optional.

The system controller 608 includes or has access to a task and workpiece database 706. For example, the task and workpiece database 706 includes a list of "jobs" that the system 600 can perform. For instance, if the system 600 includes a stamping press with multiple workstations, each "job" in the task and workpiece database 706 may include identifying information related to the processes to be performed (e.g., how many stamping operations are to be performed), how many workstations are to be used, pressing pressure for each workstation, etc. The "job" also include information about the workpiece on which the manufacturing process is to be performed, e.g., the size of the workpiece, the geometry of the workpiece, etc.

Each "job" can be assigned an identifier. For instance, if there are a hundred "jobs" stored, they can assigned serial numbers from 101 to 200, for example.

The system controller 608 is in communication with the supervisory controller 610 (e.g., via wired or wireless network). The system controller 608 can communicate several signals and information to the supervisory controller 610. For example, the system controller 608 can provide information including: the identifier of the "job" to be performed; a "heartbeat" signal indicating the status of communication between the system controller 608 and the supervisory controller 610; a STOP signal commanding the supervisory controller 610 to stop all arms if there is a system error, etc.

The supervisory controller 610 includes or has access to a motion plans database 708. Based on the job identifier, the supervisory controller 610 can retrieve, from the motion plans database 708, a corresponding motion plan that defines (i) the configuration of all the arms 606 that corresponds to the task and the workpiece associated with the job identifier, (ii) the waypoints (e.g., intermediate points, coordinates, or places that the arm linkages and joints assume on trajectory to a final position of the arm associated with the desired configuration of the arm), and (iii) the sequence of movements of the arms and their respective joints and arm linkages that the arms execute to achieve the waypoints, and ultimately achieve the desired configuration. The motion plan can include other information such as whether or not a particular sensor is active and is to be monitored, whether an end-effector it active and is to be controlled. Further, for arms that are not used, the motion plan can include information indicating that their end-effectors are to be inactive and sensors associated with the end-effector are not to be monitored. The motion plan can also include information indicative of joint speeds during execution of the motion plan.

Although the motion plans database 708 is shown disposed within the supervisory controller 610, it should be understood that it could be placed in other computing systems, with the supervisory controller 610 having network access to it. For example, the motion plans database 708 can be stored within the system controller 608 or any other computing system or server in communication with the supervisory controller 610.

The supervisory controller 610 in turn communicates signals and information back to the system controller 608. For example, the supervisory controller 610 can provide to the system controller 608 information including: the identifier of the current "job" to be performed; a status signal indicating whether the workpiece transfer subsystem 602 and the machines (e.g., stamping press, welding machine, assembly platforms, etc.) are ready; any error messages and associated diagnostic information; a "heartbeat" signal indicating the status of communication between the system controller 608 and the supervisory controller 610; whether the HMI computing device 614 or the system controller 608 has control over commands to the supervisory controller 610, etc.

As depicted in FIG. 7, the supervisory controller 610 is also in communication with the arm controllers 702A-702P (of the sixteen arms), and each arm controller of the arm controllers 702A-702P is in communication with the joint controllers 704A-704E (of the five joints) of the respective arm. As such, the supervisory controller 610 can receive information associated with the status of the arm linkages and the joints of each arm.

As examples, the supervisory controller 610 can receive from the arm controllers 702A-702P (and from the joint controllers 704A-704E via the respective arm controller) information including: joint angle values as the joints and the arm linkages are moving; vacuum pressure values (in the case the end-effectors are suction cups); a "part-present" signal indicating whether an end-effector is coupled to the arm and the state of the end-effector (e.g., is the end-effector properly attached to the arm, does the suction cup have enough vacuum pressure to operate as expected, is the end-effector damaged, etc.), and based on the "part-present" signal, the supervisory controller 610 determines whether to stop the arms; a "heartbeat" signal indicating the status of communication between the supervisory controller 610 and the arm controllers 702A-702P; a signal indicating whether the arms are moving on course to a desired configuration or stationary; whether the clutches of the joints are locked; whether the arm and motors are ready for movement; details about each arm including number of arm linkages and joints; an identifier of each arm; an indication that the arm has reached its desired commanded configuration; an error code or flag if indicating any operational issues of the arm, etc.

The supervisory controller 610 can then provide the command signals to the arm controllers 702A-702P based on such information, e.g., whether to troubleshoot an issue, whether to continue or stop executing the motion plan, etc. In an example, if the end effectors include suction cups, the part-present information indicates a vacuum pressure level that the suction cups apply, and the supervisory controller 610 can then provide an indication to the system controller 608 regarding the status of operability of the end-effector based on comparing the vacuum pressure level to a threshold pressure level.

The supervisory controller 610 in turn communicates information and commands to the arm controllers 702A-702P. For example, the supervisory controller 610 can provide to the arm controllers 702A-702P information, requests, and commands including: an identifier assigned to the arm; whether the arm should continue moving or stop; command signals to the arms to execute the motion plan, i.e., to move in a particular sequence and to go through particular waypoints, and how long to dwell at each waypoint, etc.; the motion plan retrieved from the motion plans database 708 to be executed, i.e., a series of movement commands to be executed by the arm controllers 702A-702P and the joint controllers 704A-704E; a clutch override signal to override any locking or unlocking command to a particular joint; a release clutch signal for a particular clutch at a respective joint; a reset signal to reset the arm controller and clear any error flags; a request for error flags associated with the arm; a request for status and operability of the arm; a request for the arm controller to provide details about each arm including number of arm linkages and joints; a request to provide real-time position of each joint and/or arm linkage; a command to actuate the end-effector (e.g., to apply suction via a suction cup, to operate fingers of a gripper to grip the workpiece, etc.), etc.

In an example, the supervisory controller 610 communicates the motion plan to be loaded to the arm controllers 702-702P, and then the arm controllers 702A-702P execute the motion plan by sending commands to the respective joint controllers. In another example, the supervisory controller 610 provides sequential commands to execute the motion plan to the arm controllers 702A-702P, which in turn communicate the commands to the joint controllers 704A-704E of each arm. The commands move the arms (i.e., the joints and arm linkages) in a particular sequence to achieve specific waypoints for each arm while avoiding colliding with each other until a final desired configuration is achieved.

Such final configuration is based on the type of task and workpiece. FIGS. 8-11 illustrate several example configurations that are based on the type of workpiece to be handled by the system 600 and the workpiece transfer subsystem 602.

Figure 8:
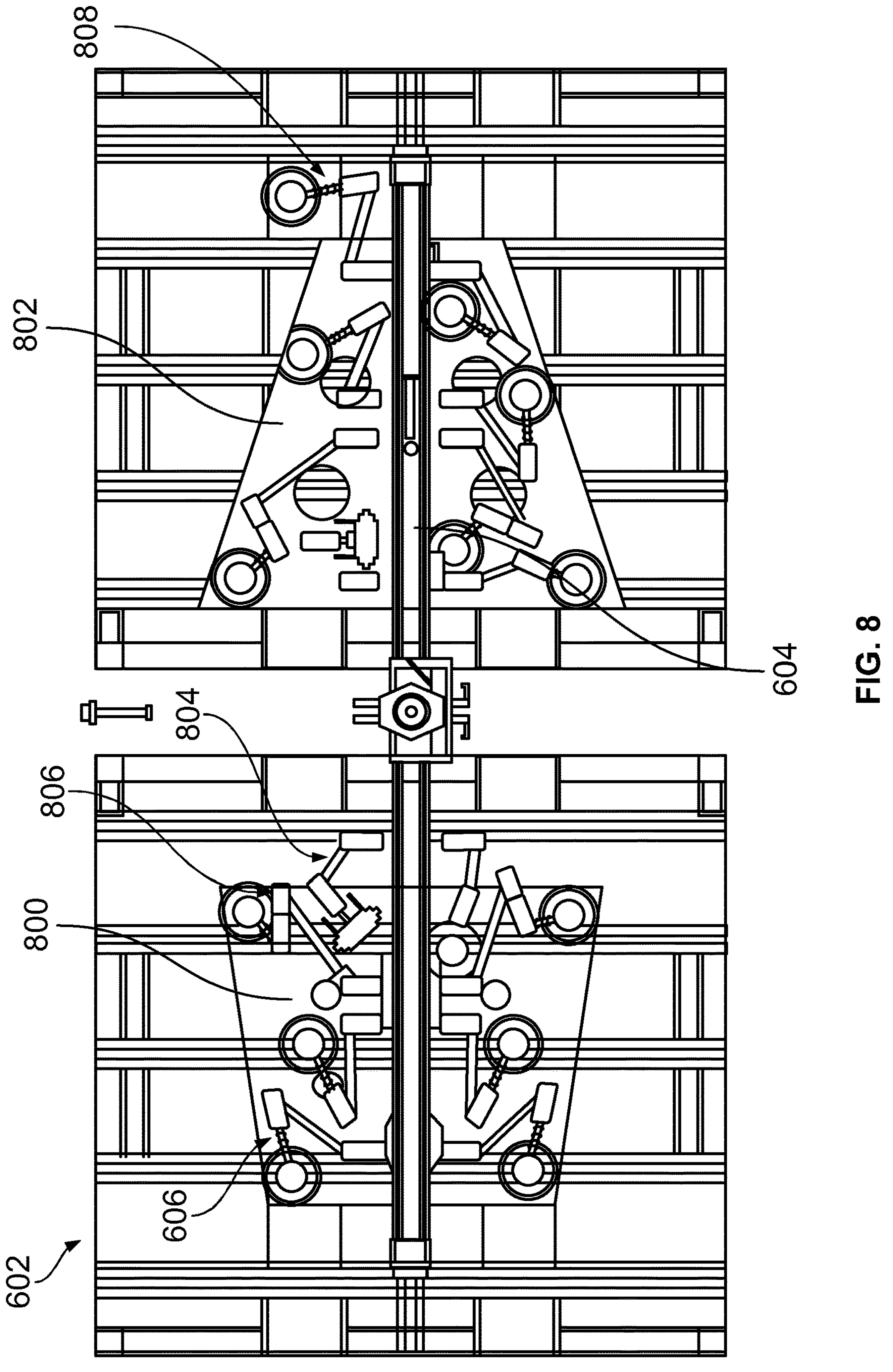
FIG. 8 illustrates a workpiece transfer subsystem with arms 606 in a particular configuration for handling two workpieces, in accordance with an example implementation.

FIG. 8 illustrates the workpiece transfer subsystem 602 with the arms 606 in a particular configuration for handling two workpieces, in accordance with an example implementation. As depicted in FIG. 8, the workpiece transfer subsystem 602 is handling a first workpiece 800 and a second workpiece 802 at the same time. The workpiece 800, 802 are relatively small, and therefore the arms 606 can handle both of them at the same time. As an example for illustration, the workpieces 800, 802 may represent fenders of a car.

The configuration of the arms 606 is suitable to handle the workpieces and move them between two successive workstations. As shown, the arms 606 are nestled or entangled in a complex way, and some of the arms overlap with other adjacent arms. For example, arm 804 is within rotational space of arm 806. Further, fifteen of the sixteen arms are used, and only one arm 808 is placed in an inactive position where its suction cup does not engage the workpiece 802.

The system controller 608 provides to the supervisory controller 610 an identifier associated with the "job" or task of handling the workpieces 800, 802 through successive workstations. The supervisory controller 610 then retrieves from the motion plans database 708 the motion plan corresponding to the identifier. The supervisory controller 610 then provides the motion plan to the arm controller 702A-702P or send command signals to the arm controllers 702A-702P based on the motion plan. The arm controller 702A-702P in turn command their respective joints controllers 704A-704E to execute a sequence of movements, going through particular waypoints, until the final configuration shown in FIG. 8 is achieved.

In another example, the workpiece transfer subsystem 602 may be required to handle a smaller workpiece and shuttle it between workstations. A different arm configuration may be suitable to the smaller workpiece than the one shown in FIG. 8.

Figures 9, 10:
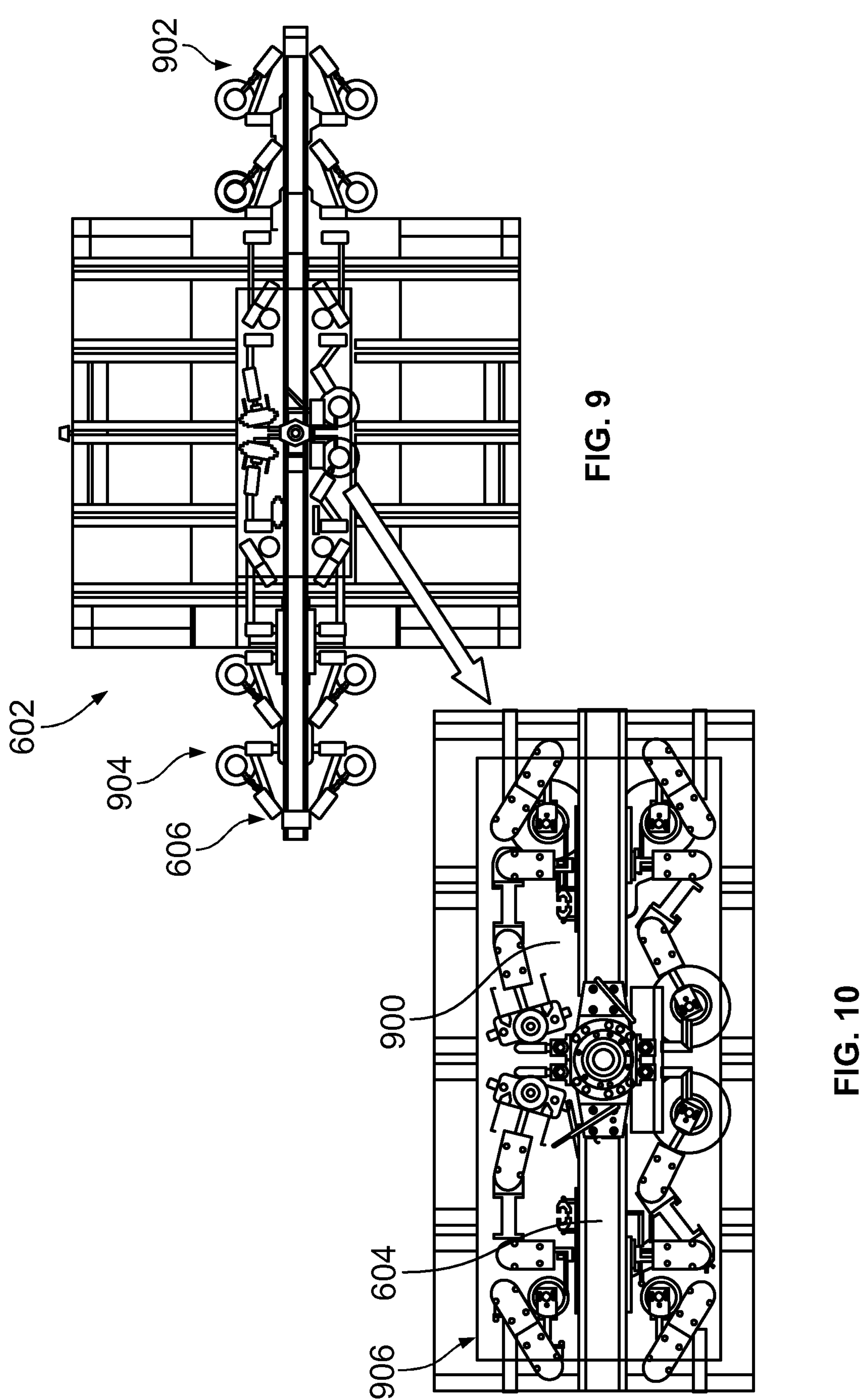
FIG. 9 illustrates a workpiece transfer subsystem with arms in a particular configuration for handling a workpiece, in accordance with an example implementation.
FIG. 10 illustrates a partial, enlarged view of a arms engaging the workpiece shown in FIG. 9, in accordance with an example implementation.

FIG. 9 illustrates the workpiece transfer subsystem 602 with the arms 606 in a particular configuration for handling a workpiece 900, and FIG. 10 illustrates a partial, enlarged view of the arms engaging the workpiece 900, in accordance with an example implementation. The system controller 608 receives information, e.g., via an operator or via a computing device, that a new "job" is to be initiated involving a series of manufacturing operations on the workpiece 900.

The system controller 608 then provides an associated job identifier to the supervisory controller 610 to retrieve the corresponding motion plan.

The supervisory controller 610 then communicates with the arm controllers 702A-702P to execute the motion plan and achieve the arm configuration shown in FIGS. 9-10. Particularly, eight arms, include four arms 902 at one end of the rail 604 and another set of four arms 904 at the other end of the rail 604 are placed in an inactive or "parked" position as they are not required to handle the workpiece 900. Eight arms 906 coupled to a middle portion of the rail 604 as shown in FIG. 10 are retracted closer to the rail 604 and are placed in a configuration where they engage the workpiece 900.

It may be desirable to perform manufacturing operations on another workpiece that is large and requiring a different arm configuration. For instance, if the workpieces 800, 802 in FIG. 2 represent fenders of a car, it may be desirable to subsequently perform operations on a large body panel (a whole side panel) of a car. A different arm configuration may thus be required.

Figure 11:
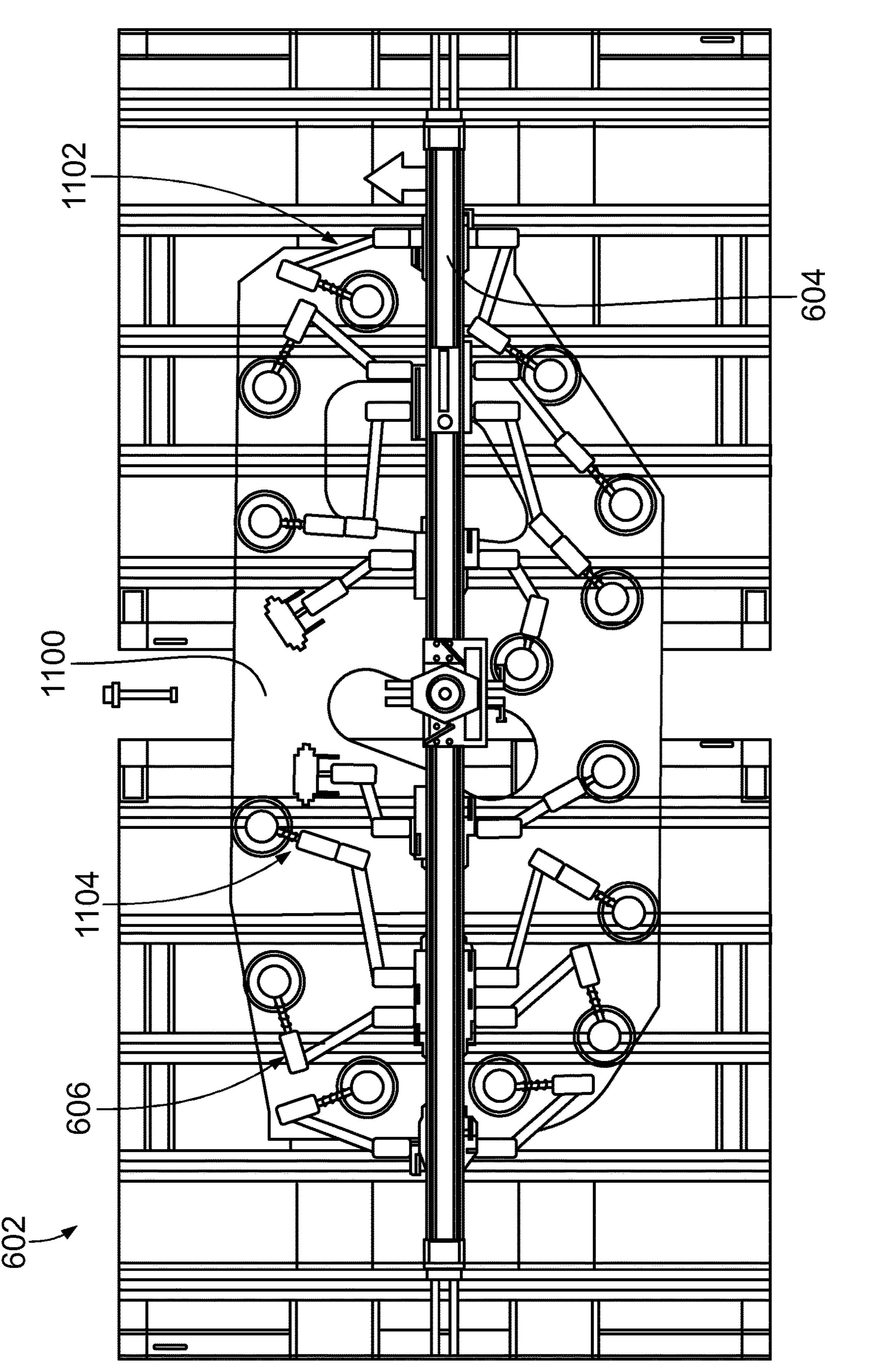
FIG. 11 illustrates a workpiece transfer subsystem with arms in a particular configuration for handling another workpiece, in accordance with an example implementation.

FIG. 11 illustrates the workpiece transfer subsystem 602 with the arms 606 in a particular configuration for handling another workpiece 1100, in accordance with an example implementation. The system controller 608 receives information, e.g., via an operator or via a computing device, that a new "job" is to be initiated involving a series of manufacturing operations on the workpiece 1100. The system controller 608 then provides an associated job identifier to the supervisory controller 610 to retrieve the corresponding motion plan.

The supervisory controller 610 then communicates with the arm controllers 702A-702P to execute the motion plan and achieve the arm configuration shown in FIG. 11. Particularly, because of the size of the workpiece 1100, all of the arms 606 are used to engage the workpiece 1100. Further, some of the suction cups are placed closer to the rail 604, while others extend to edges of the workpiece 1100 due to the large width of the workpiece 1100. Thus, while some arms such as arm 1102 are retracted closer to the rail 604, others such as arm 1104 extend outwardly closer to the edges of the workpiece 1100.

In the example systems where the HMI computing device 614 is used, the supervisory controller 610 is in communication, and can exchange signals, with the HMI computing device 614. As examples, the supervisory controller 610 can provide to the HMI computing device 614 information including: joint angle values as the joints and the arm linkages are moving; vacuum pressure values (in the case the end-effectors are suction cups); a "heartbeat" signal indicating the status of communication between the supervisory controller 610 and the arm controllers 702A-702P; an error flag indicating status of communication; an error flag indicating whether the arms 606 are moving when they are not commanded to so do; an indication of which device has control (e.g., whether the system controller 608 or the HMI computing device 614 can control movements of the arms 606); signals indicating current status of the system such as whether the arms 606 are moving, stopped, waiting, or ready to move; communication status between the system controller 608 and the supervisory controller 610 and between the supervisory controller 610 and the arm controllers 702A-702P; the identifier of the current "job" being performed by the system 600; an error log to facilitate troubleshooting the system 600 via the HMI computing device 614, etc.

The HMI computing device 614 in turn communicates information back to the supervisory controller 610. For example, the HMI computing device 614 can provide to the supervisory controller 610 information, requests, and commands including: a request to gain control over the system 600; a signal to turn vacuum on or off (if the end-effectors include suction cups); a command to enable continual vacuum generation in the suction cups to facilitate testing and maintenance of the vacuum generating system; a command to change the "part-present" threshold pressure level at which the supervisory controller 610 determines whether the suction cup and vacuum generation are working properly; a command to move an arm or a particular joint to a new position; a command to lock or unlock a joint; an override command that modifies a motion plan, etc.

As an example for illustration, the supervisory controller 610 can receive the identifier of the "job" from the system controller 608, retrieve the associated motion plan, and communicate with the arm controllers 702A-702P to execute the motion plan and achieve a desired configuration. Upon the arms 606 achieving the desired configuration, an operator may determine that it may be desirable to make modifications to the configuration. For example, the operator can grab an arm linkage or joint and move it to a modified position or the operator can use the HMI computing device 614 to command an arm or a joint to move to a modified position.

As another example, the operator can use the HMI computing device 614 to modify the waypoints or the time that a joint or arm linkage dwell at the waypoint during the sequence of movements of the arms, or to make other modifications. The HMI computing device 614 can provide the modifications to the supervisory controller 610, which then modifies the motion plan associated with the identifier accordingly.

The HMI computing device 614 can thus be used to modify waypoint, delete waypoints, insert new waypoints, etc. The supervisory controller 610 then modifies the motion plan accordingly and saves the modified motion plan to the motion plans database 708.

Components of the system 600 may be configured to work in an interconnected fashion with each other and/or with other components coupled to respective systems. One or more of the described operations or components of the system 600 may be divided up into additional operational or physical components, or combined into fewer operational or physical components. In some further examples, additional operational and/or physical components may be added to the examples illustrated by FIGS. 6-7. Still further, any of the components or modules of the system 600 may include or be provided in the form of a processor (e.g., a microprocessor, a digital signal processor, etc.) configured to execute program code including one or more instructions for implementing logical operations described herein. The system 600 may further include any type of computer readable medium (non-transitory medium) or memory, for example, such as a storage device including a disk or hard drive, to store the program code that when executed by one or more processors cause the system 600 to perform the operations described above. In an example, the system 600 may be included within other systems.

Figure 12:
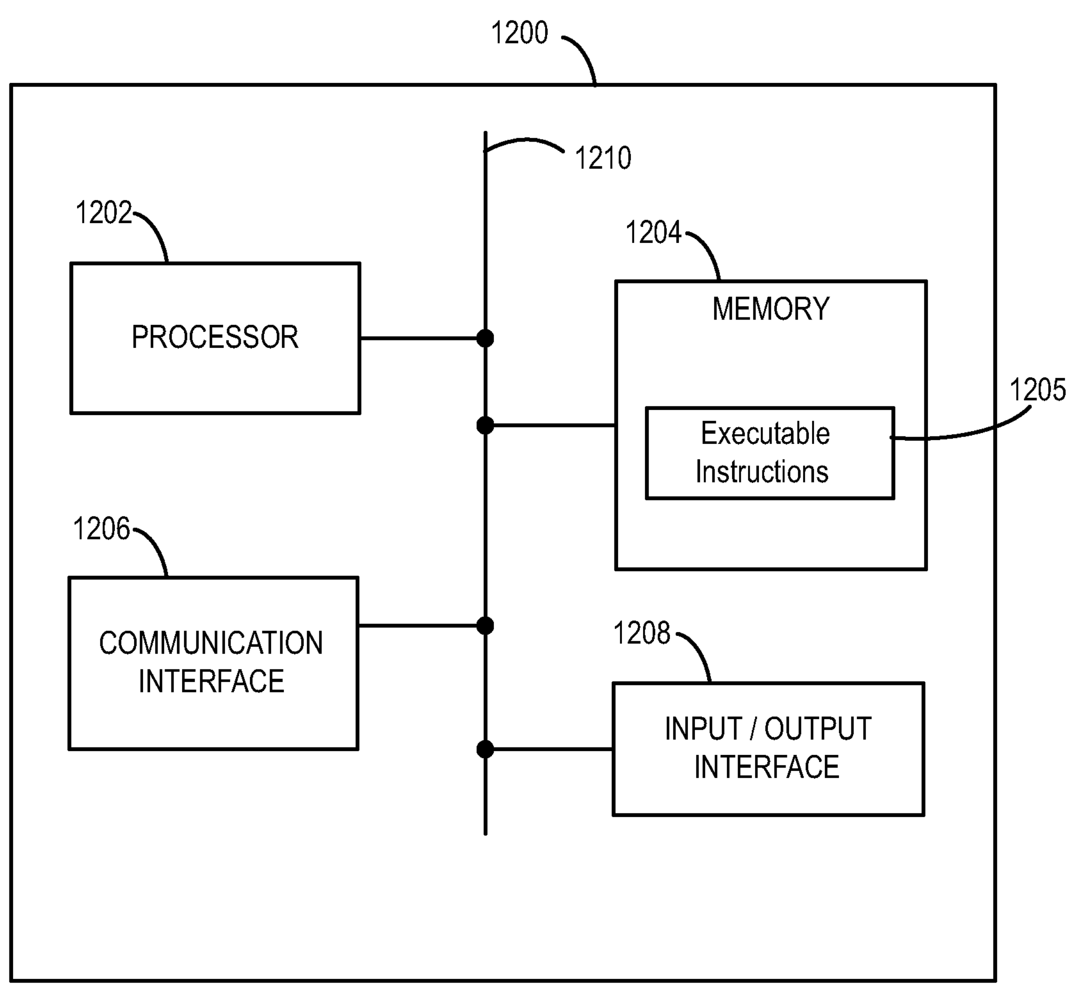
FIG. 12 illustrates a block diagram exemplifying a computing device, in accordance with an example implementation.

FIG. 12 is a block diagram exemplifying a computing device 1200, in accordance with an example implementation. The computing device 1200 represents, for example, any of the controllers described above such as the system controller 608, the supervisory controller 610, the computing device 612, the HMI computing device 614, the arm controllers 702A-702P, and the joint controllers 704A-704E.

The computing device 1200 includes a processor 1202, a data storage or memory 1204 have stored thereon executable instructions 1205 that are executable by the processor 1202, communication interface 1206, and an input/output interface 1208, all of which may be coupled by a system bus 1210 or a similar mechanism. In some embodiments, computing device 1200 may include other components and/or peripheral devices (e.g., detachable storage, etc.).

The processor 1202 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, the processor 1202 may be one or more single-core processors. In other cases, the processor 1202 may be one or more multi-core processors with multiple independent processing units. The processor 1202 may also include register memory for temporarily storing instructions being executed and related data, as well as cache memory for temporarily storing recently-used instructions and data.

The memory 1204 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, the memory 1204 represents both main memory units, as well as long-term storage.

The memory 1204 stores thereon the executable instructions 1205 and data on which the executable instructions 1205 may operate. By way of example, the memory 1204 may store the executable instructions 1205 on a non-transitory computer-readable medium, such that the instructions are executable by the processor 1202 to carry out any of the methods, processes, or operations disclosed in this specification or the accompanying drawings. The memory 1204 can also include the operating system of the computing device 1200 and various software modules, firmware, and applications. The memory 1204 can further include databases such as the task and workpiece database 706 in the case of the system controller 608 or the motion plans database 708 in the case of the supervisory controller 610.

The communication interface 1206 allows the computing device 1200 to communicate with various networks (e.g., the internet, a CAN network, a proprietary network, etc.). The communication interface 1206 may take the form of one or more wireline interfaces, such as Ethernet (e.g., Fast Ethernet, Gigabit Ethernet, and so on). The communication interface 1206 may also support communication over one or more non-Ethernet media, such as coaxial cables or power lines, or over wide-area media, such as Synchronous Optical Networking (SONET) or digital subscriber line (DSL) technologies. The communication interface 1206 may additionally take the form of one or more wireless interfaces, such as IEEE 802.11 (Wi-Fi), BLUETOOTH®, global positioning system (GPS), or a wide-area wireless interface. However, other forms of physical layer interfaces and other types of standard or proprietary communication protocols may be used over the communication interface 1206. Furthermore, the communication interface 1206 may comprise multiple physical interfaces. For instance, some implementations of the computing device 1200 may include Ethernet, BLUETOOTH®, and Wi-Fi interfaces.

The input/output interface 1208 may facilitate user and peripheral device interaction with computing device 1200. The input/output interface 1208 may include one or more types of input devices, such as a keyboard, a mouse, a touch screen, and so on. Similarly, the input/output interface 1208 may include one or more types of output devices, such as a screen, monitor, printer, and/or one or more light emitting diodes (LEDs). Additionally or alternatively, the computing device 1200 may communicate with other devices using a universal serial bus (USB) or high-definition multimedia interface (HDMI) port interface, for example.

FIG. 13 is a flowchart of a method 1300 for operating a workpiece transfer system, in accordance with an example implementation. The method 1300 can, for example, be performed by the supervisory controller 610 to control the arms 606 based on communication with the system controller 608 and the HMI computing device 614 if present.

The method 1300 may include one or more operations, or actions as illustrated by one or more of blocks 1302-1308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1300 and other processes and operations disclosed herein, the flowchart shows operation of one possible implementation of present examples. In this regard, each block may represent a module, a segment, or a portion of program code, which includes one or more instructions executable by a processor (e.g., a processor or microprocessor of the supervisory controller 610) or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1300 and other processes and operations disclosed herein, one or more blocks in FIG. 13 may represent circuitry or digital logic that is arranged to perform the specific logical operations in the process.

At block 1302, the method 1300 includes receiving, at a supervisory controller (e.g., the supervisory controller 334, 610) of a workpiece transfer system (e.g., the system 100, 300, 400, 600), task identification information (e.g., job identifier) indicative of a manufacturing task (e.g., i.e., "job") to be performed on a workpiece using successive workstations, wherein the workpiece transfer system comprises a rail (e.g., the rail 102, 302, 402, 404, 604) and a plurality of arms (e.g., the arms 104, 200, 304, 306, 412, 414, 500, 606) coupled to the rail, wherein each arm comprises (i) a plurality of arm linkages coupled at respective joints, (ii) an arm controller (e.g., any of the arm controllers 702A-702P) in communication with the supervisory controller, and (iii) respective joint controllers (e.g., the joint controllers 704A-704E) in communication with the arm controller and configured to actuate respective rotary actuators at the respective joints to move the plurality of arm linkages relative to each other. The task identification information can include, for example, information indicative of a size and geometry of the workpiece.

At block 1304, the method 1300 includes, based on the task identification information, retrieving, by the supervisory controller, a motion plan corresponding to the manufacturing task and the workpiece, wherein the motion plan comprises a sequence of movements for each arm of the plurality of arms and the respective joints indicating when a respective rotary actuator is to be actuated and an order in which respective rotary actuators are actuated to achieve a final desired configuration for the plurality of arms.

As mentioned above, in examples, the motion plan can further include a series of waypoints for each arm of the plurality of arms and the respective joints of the arm, wherein a waypoint comprises an intermediate point that an arm linkage or joint assume on course to a final position associated with the final desired configuration. The motion plan can further include a dwelling time for each arm of the plurality of arms at each waypoint of the series of waypoints. The motion plan can include other information such as whether or not a particular sensor is active and is to be monitored, whether an end-effector it active and is to be controlled. Further, for arms that are not used, the motion plan can include information indicating that their end-effectors are to be inactive and sensors associated with the end-effector are not to be monitored. The motion plan can also include information indicative of joint speeds during execution of the motion plan.

At block 1306, the method 1300 includes sending, by the supervisory controller, command signals to respective arm controllers of the plurality of arms to communicate respective command signals to the respective joint controllers and execute the motion plan.

In an example, the motion plan further comprises an indication of a subset of arms (e.g., the eight arms 906) to be active in engaging the workpiece while moving the workpiece between the successive workstations. In this example, sending the command signals to execute the motion plan can include sending the command signals to position remaining arms (e.g., the four arms 902 and the four arms 904 or the arm 808) of the plurality of arms, other than the subset of arms, in an inactive position. Sensors of the arms that are inactive might not be monitored, their end-effectors might not be activated, and sensors associated with operation of the end-effectors might not be monitored.

At block 1308, the method 1300 includes once the final desired configuration is achieved, commanding, by the supervisory controllers, the respective arm controllers to lock the respective joints (e.g., actuate clutches or apply brakes at the respective joints to lock the respective joints in position).

The method can include additional operations that may be executed and performed with the method 1300 as described throughout herein. As an example, the method can further include receiving, from the HMI computing device 614, a request to change the final desired configuration of the plurality of arms or the sequence of movements for each arm of the plurality of arms; and responsively, modifying, by the supervisory controller, the motion plan.

In another example, the method can further include communicating and receiving information from the system controller 608, the HMI computing device 614, and the arm controllers 702A-702P. As a particular example, the supervisory controller can receive from the arm controllers, status information indicative of one or more of: (i) joint angle values as the respective joints of each arm of the plurality of arms are moving, (ii) a signal indicating whether the plurality of arms are moving on course to the final desired configuration, (iii) whether the respective joints are locked, (iv) whether the plurality of arms and the respective rotary actuators are ready for movement, (v) a number of arm linkages and joints for a particular arm of the plurality of arms, and (vi) an indication that an arm has reached a desired final position. In this example, sending the command signals to the respective arm controllers is based on the status information. For instance, if any of the information indicate an error, the supervisory controller 610 can stop execution of the motion plan and provide an error flag or other indication to the operator.

In another example, each arm of the plurality of arms is coupled to an end-effector. In this example, the method can further include receiving, at the supervisory controller from the respective arm controllers, part-present information indicating a status of operability of the end-effector; and providing an indication of the status of operability of the end-effector (e.g., to the system controller 608). For instance, the end-effector can include a suction cup, and the part-present information indicates a vacuum pressure level that the suction cup applies. In this case, the method may further include comparing the vacuum pressure level to a threshold pressure level. If the vacuum pressure level is less than the threshold, the supervisory controller can determine that the end-effector is not operating properly or ready to attach to the workpiece and may provide an indication to the system controller 608 to stop operations.

In another example, the workpiece transfer system has a rail actuator coupled to the rail and configured to move the rail and the plurality of arms coupled thereto between the successive workstations. The system may include a system controller in communication with the supervisory controller. In this example, the method can further include the system controller commanding the rail actuator to move the rail, the plurality of arms, and the workpiece attached to the plurality of arms from a first workstation of the successive workstations to a second workstation of the successive workstations. The method can further include releasing (e.g., via the supervisory controller or arm controller) the workpiece from the plurality of arms at the second workstation; and commanding, by the system controller, the rail actuator to move the rail and the plurality of arms coupled thereto back to the first workstation to attach to another workpiece.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Implementations of the present disclosure can thus relate to one of the enumerated example implementation (EEEs) listed below.

EEE 1 is a method comprising: receiving, at a supervisory controller of a workpiece transfer system, task identification information indicative of a manufacturing task to be performed on a workpiece using successive workstations, wherein the workpiece transfer system comprises a rail and a plurality of arms coupled to the rail, wherein each arm comprises (i) a plurality of arm linkages coupled at respective joints, (ii) an arm controller in communication with the supervisory controller, and (iii) respective joint controllers in communication with the arm controller and configured to actuate respective rotary actuators at the respective joints to move the plurality of arm linkages relative to each other; based on the task identification information, retrieving, by the supervisory controller, a motion plan corresponding to the manufacturing task and the workpiece, wherein the motion plan comprises a sequence of movements for each arm of the plurality of arms and the respective joints indicating when a respective rotary actuator is to be actuated and an order in which respective rotary actuators are actuated to achieve a final desired configuration for the plurality of arms; sending, by the supervisory controller, command signals to respective arm controllers of the plurality of arms to communicate respective command signals to the respective joint controllers and execute the motion plan; and once the final desired configuration is achieved, commanding, by the supervisory controllers, the respective arm controllers to lock the respective joints.

EEE 2 is the method of EEE 1, wherein the motion plan further comprises a series of waypoints for each arm of the plurality of arms and the respective joints of the arm, wherein a waypoint comprises an intermediate point that an arm linkage or joint assume on course to a final position associated with the final desired configuration.

EEE 3 is the method of EEE 2, wherein the motion plan further comprises a dwelling time for each arm of the plurality of arms at each waypoint of the series of waypoints.

EEE 4 is the method of any of EEEs 1-3, wherein the motion plan further comprises an indication of a subset of arms to be active in engaging the workpiece while moving the workpiece between the successive workstations, and wherein sending the command signals to execute the motion plan comprises: sending the command signals to position remaining arms of the plurality of arms, other than the subset of arms, in an inactive position.

EEE 5 is the method of any of EEEs 1-4, further comprising: receiving, from a human-machine interface computing device in communication with the supervisory controller, a request to change the final desired configuration of the plurality of arms or the sequence of movements for each arm of the plurality of arms; and responsively, modifying, by the supervisory controller, the motion plan.

EEE 6 is the method of any of EEEs 1-5, further comprising: receiving, at the supervisory controller from the respective arm controllers, status information indicative of one or more of: (i) joint angle values as the respective joints of each arm of the plurality of arms are moving, (ii) a signal indicating whether the plurality of arms are moving on course to the final desired configuration, (iii) whether the respective joints are locked, (iv) whether the plurality of arms and the respective rotary actuators are ready for movement, (v) a number of arm linkages and joints for a particular arm of the plurality of arms, and (vi) an indication that an arm has reached a desired final position, wherein sending the command signals to the respective arm controllers is based on the status information.

EEE 7 is the method of any of EEEs 1-6, wherein each arm of the plurality of arms is coupled to an end-effector, and wherein the method further comprises: receiving, at the supervisory controller from the respective arm controllers, part-present information indicating a status of operability of the end-effector; and providing an indication of the status of operability of the end-effector.

EEE 8 is the method of EEE 7, wherein the end-effector comprises a suction cup, wherein the part-present information indicates a vacuum pressure level that the suction cup applies, and wherein the method further comprises comparing the vacuum pressure level to a threshold pressure level to determine the status of operability of the-end effector.

EEE 9 is the method of any of EEEs 1-8, wherein the workpiece transfer system further comprises a rail actuator coupled to the rail and configured to move the rail and the plurality of arms coupled thereto between the successive workstations, and wherein the method further comprises: commanding, by a system controller in communication with the supervisory controller, the rail actuator to move the rail, the plurality of arms, and the workpiece attached to the plurality of arms from a first workstation of the successive workstations to a second workstation of the successive workstations.

EEE 10 is the method of EEE 9, further comprising: releasing the workpiece from the plurality of arms at the second workstation; and commanding, by the system controller, the rail actuator to move the rail and the plurality of arms coupled thereto back to the first workstation to attach to another workpiece.

EEE 11 is the method of any of EEEs 1-10, wherein the task identification information comprises information indicative of a size and geometry of the workpiece.

EEE 12 is a system comprising: a workpiece transfer subsystem configured to transfer a workpiece between successive workstations, wherein the workpiece transfer subsystem comprises a rail and a plurality of arms coupled to the rail, wherein each arm comprises (i) a plurality of arm linkages coupled at respective joints, (ii) an arm controller, and (iii) respective joint controllers in communication with the arm controller and configured to actuate respective rotary actuators at the respective joints to move the plurality of arm linkages relative to each other; a system controller having access to a task and workpiece database comprising task identification information for a variety of manufacturing tasks to be performed on a variety of workpieces; and a supervisory controller in communication with the system controller and respective arm controllers of the plurality of arms, wherein the supervisory controller has access to a motion plans database comprising respective motion plans corresponding to the variety of manufacturing tasks, wherein each motion plan comprises a sequence of movements for each arm of the plurality of arms and the respective joints indicating when a respective rotary actuator is to be actuated and an order in which respective rotary actuators are actuated to achieve a final desired configuration for the plurality of arms, wherein the supervisory controller comprises one or more processors, and a non-transitory computer-readable medium storing thereon instructions that, when executed by the one or more processors, cause the supervisory controller to perform operations comprising: receiving task identification information from the system controller, retrieving a motion plan corresponding to the task identification information, sending command signals to respective arm controllers of the plurality of arms to communicate respective command signals to the respective joint controllers and execute the motion plan, and once the final desired configuration is achieved, commanding the respective arm controllers to lock the respective joints.

EEE 13 is the system of EEE 12, wherein the motion plan further comprises (i) a series of waypoints for each arm of the plurality of arms and the respective joints of the arm, wherein a waypoint comprises an intermediate point that an arm linkage or joint assume on course to a final position associated with the final desired configuration, and (ii) a dwelling time for each arm of the plurality of arms at each waypoint of the series of waypoints.

EEE 14 is the system of any of EEEs 12-13, wherein the motion plan further comprises an indication of a subset of arms to be active in engaging the workpiece while moving the workpiece between the successive workstations, and wherein sending the command signals to execute the motion plan comprises: sending the command signals to position remaining arms of the plurality of arms, other than the subset of arms, in an inactive position.

EEE 15 is the system of any of EEEs 12-14, further comprising: a human-machine interface computing device in communication with the supervisory controller, wherein the operations further comprise: receiving, from the human-machine interface computing device, a request to change the final desired configuration of the plurality of arms or the sequence of movements for each arm of the plurality of arms; and responsively, modifying the motion plan.

EEE 16 is the system of any of EEEs 12-15, wherein the operations further comprise: receiving, from the respective arm controllers, status information indicative of one or more of: (i) joint angle values as the respective joints of each arm of the plurality of arms are moving, (ii) a signal indicating whether the plurality of arms are moving on course to the final desired configuration, (iii) whether the respective joints are locked, (iv) whether the plurality of arms and the respective rotary actuators are ready for movement, (v) a number of arm linkages and joints, and (vi) an indication that an arm has reached a desired final position, wherein sending the command signals to the respective arm controllers is based on the status information.

EEE 17 is the system of any of EEEs 12-16, wherein each arm of the plurality of arms is coupled to an end-effector, wherein the operations further comprise: receiving, from the respective arm controllers, part-present information indicating a status of operability of the end-effector; and providing, to the system controller, an indication of the status of operability of the end-effector.

EEE 18 is the system of EEE 17, wherein the end-effector comprises a suction cup, wherein the part-present information indicates a vacuum pressure level that the suction cup applies, and wherein the operations further comprise: comparing the vacuum pressure level to a threshold pressure level to determine the status of operability of the end-effector.

EEE 19 is the system of any of EEEs 12-18, wherein the workpiece transfer subsystem further comprises a rail actuator coupled to the rail and configured to move the rail and the plurality of arms coupled thereto between the successive workstations, and wherein the system controller perform operations comprising: commanding the rail actuator to move the rail, the plurality of arms, and the workpiece attached to the plurality of arms from a first workstation of the successive workstations to a second workstation of the successive workstations.

EEE 20 is the system of EEE 19, wherein the supervisory controller perform further operations comprising causing the plurality of arms to release the workpiece at the second workstation, and wherein the system controller performs further operations comprising commanding the rail actuator to move the rail and the plurality of arms coupled thereto back to the first workstation to attach to another workpiece.

What is claimed is:

1. A method comprising:

receiving, at a supervisory controller of a workpiece transfer system, task identification information indicative of a manufacturing task to be performed on a workpiece using successive workstations, wherein the workpiece transfer system comprises a rail and a plurality of arms coupled to the rail, wherein each arm comprises (i) a plurality of arm linkages coupled at respective joints, (ii) an arm controller in communication with the supervisory controller, and (iii) respective joint controllers in communication with the arm controller and configured to actuate respective rotary actuators at the respective joints to move the plurality of arm linkages relative to each other;

based on the task identification information, retrieving, by the supervisory controller, a motion plan corresponding to the manufacturing task and the workpiece, wherein the motion plan comprises a sequence of movements for each arm of the plurality of arms and the respective joints indicating when a respective rotary actuator is to be actuated and an order in which respective rotary actuators are actuated to achieve a final desired configuration for the plurality of arms;

sending, by the supervisory controller, command signals to respective arm controllers of the plurality of arms to communicate respective command signals to the respective joint controllers and execute the motion plan; and once the final desired configuration is achieved, commanding, by the supervisory controllers, the respective arm controllers to lock the respective joints.

2. The method of claim 1, wherein the motion plan further comprises a series of waypoints for each arm of the plurality of arms and the respective joints of the arm, wherein a waypoint comprises an intermediate point that an arm linkage or joint assume on course to a final position associated with the final desired configuration.

3. The method of claim 2, wherein the motion plan further comprises a dwelling time for each arm of the plurality of arms at each waypoint of the series of waypoints.

4. The method of claim 1, wherein the motion plan further comprises an indication of a subset of arms to be active in engaging the workpiece while moving the workpiece between the successive workstations, and wherein sending the command signals to execute the motion plan comprises:

sending the command signals to position remaining arms of the plurality of arms, other than the subset of arms, in an inactive position.

5. The method of claim 1, further comprising:

receiving, from a human-machine interface computing device in communication with the supervisory controller, a request to change the final desired configuration of the plurality of arms or the sequence of movements for each arm of the plurality of arms; and responsively, modifying, by the supervisory controller, the motion plan.

6. The method of claim 1, further comprising:

receiving, at the supervisory controller from the respective arm controllers, status information indicative of one or more of: (i) joint angle values as the respective joints of each arm of the plurality of arms are moving, (ii) a signal indicating whether the plurality of arms are moving on course to the final desired configuration, (iii) whether the respective joints are locked, (iv) whether the plurality of arms and the respective rotary actuators are ready for movement, (v) a number of arm linkages and joints for a particular arm of the plurality of arms, and (vi) an indication that an arm has reached a desired final position, wherein sending the command signals to the respective arm controllers is based on the status information.

7. The method of claim 1, wherein each arm of the plurality of arms is coupled to an end-effector, and wherein the method further comprises:

receiving, at the supervisory controller from the respective arm controllers, part-present information indicating a status of operability of the end-effector; and providing an indication of the status of operability of the end-effector.

8. The method of claim 7, wherein the end-effector comprises a suction cup, wherein the part-present information indicates a vacuum pressure level that the suction cup applies, the method further comprising:

comparing the vacuum pressure level to a threshold pressure level to determine the status of operability of the end-effector.

9. The method of claim 1, wherein the workpiece transfer system further comprises a rail actuator coupled to the rail and configured to move the rail and the plurality of arms coupled thereto between the successive workstations, and wherein the method further comprises:

commanding, by a system controller in communication with the supervisory controller, the rail actuator to move the rail, the plurality of arms, and the workpiece attached to the plurality of arms from a first workstation of the successive workstations to a second workstation of the successive workstations.

10. The method of claim 9, further comprising:

releasing the workpiece from the plurality of arms at the second workstation; and commanding, by the system controller, the rail actuator to move the rail and the plurality of arms coupled thereto back to the first workstation to attach to another workpiece.

11. The method of claim 1, wherein the task identification information comprises information indicative of a size and geometry of the workpiece.

12. A system comprising:

a workpiece transfer subsystem configured to transfer a workpiece between successive workstations, wherein the workpiece transfer subsystem comprises a rail and a plurality of arms coupled to the rail, wherein each arm comprises (i) a plurality of arm linkages coupled at respective joints, (ii) an arm controller, and (iii) respective joint controllers in communication with the arm controller and configured to actuate respective rotary actuators at the respective joints to move the plurality of arm linkages relative to each other;

a system controller having access to a task and workpiece database comprising task identification information for a variety of manufacturing tasks to be performed on a variety of workpieces; and a supervisory controller in communication with the system controller and respective arm controllers of the plurality of arms, wherein the supervisory controller has access to a motion plans database comprising respective motion plans corresponding to the variety of manufacturing tasks, wherein each motion plan comprises a sequence of movements for each arm of the plurality of arms and the respective joints indicating when a respective rotary actuator is to be actuated and an order in which respective rotary actuators are actuated to achieve a final desired configuration for the plurality of arms, wherein the supervisory controller comprises one or more processors, and a non-transitory computer-readable medium storing thereon instructions that, when executed by the one or more processors, cause the supervisory controller to perform operations comprising:

receiving task identification information from the system controller, retrieving a motion plan corresponding to the task identification information, sending command signals to respective arm controllers of the plurality of arms to communicate respective command signals to the respective joint controllers and execute the motion plan, and once the final desired configuration is achieved, commanding the respective arm controllers to lock the respective joints.

13. The system of claim 12, wherein the motion plan further comprises (i) a series of waypoints for each arm of the plurality of arms and the respective joints of the arm, wherein a waypoint comprises an intermediate point that an arm linkage or joint assume on course to a final position associated with the final desired configuration, and (ii) a dwelling time for each arm of the plurality of arms at each waypoint of the series of waypoints.

14. The system of claim 12, wherein the motion plan further comprises an indication of a subset of arms to be active in engaging the workpiece while moving the workpiece between the successive workstations, and wherein sending the command signals to execute the motion plan comprises:

sending the command signals to position remaining arms of the plurality of arms, other than the subset of arms, in an inactive position.

15. The system of claim 12, further comprising:

a human-machine interface computing device in communication with the supervisory controller, wherein the operations further comprise:

receiving, from the human-machine interface computing device, a request to change the final desired configuration of the plurality of arms or the sequence of movements for each arm of the plurality of arms; and responsively, modifying the motion plan.

16. The system of claim 12, wherein the operations further comprise:

receiving, from the respective arm controllers, status information indicative of one or more of: (i) joint angle values as the respective joints of each arm of the plurality of arms are moving, (ii) a signal indicating whether the plurality of arms are moving on course to the final desired configuration, (iii) whether the respective joints are locked, (iv) whether the plurality of arms and the respective rotary actuators are ready for movement, (v) a number of arm linkages and joints, and (vi) an indication that an arm has reached a desired final position, wherein sending the command signals to the respective arm controllers is based on the status information.

17. The system of claim 12, wherein each arm of the plurality of arms is coupled to an end-effector, wherein the operations further comprise:

receiving, from the respective arm controllers, part-present information indicating a status of operability of the end-effector; and providing, to the system controller, an indication of the status of operability of the end-effector.

18. The system of claim 17, wherein the end-effector comprises a suction cup, wherein the part-present information indicates a vacuum pressure level that the suction cup applies, and wherein the operations further comprise:

comparing the vacuum pressure level to a threshold pressure level to determine the status of operability of the end-effector.

19. The system of claim 12, wherein the workpiece transfer subsystem further comprises a rail actuator coupled to the rail and configured to move the rail and the plurality of arms coupled thereto between the successive workstations, and wherein the system controller perform operations comprising:

commanding the rail actuator to move the rail, the plurality of arms, and the workpiece attached to the plurality of arms from a first workstation of the successive workstations to a second workstation of the successive workstations.

20. The system of claim 19, wherein the supervisory controller perform further operations comprising causing the plurality of arms to release the workpiece at the second workstation, and wherein the system controller performs further operations comprising commanding the rail actuator to move the rail and the plurality of arms coupled thereto back to the first workstation to attach to another workpiece.

* * * * *